(12) United States Patent
Chiba et al.

(10) Patent No.: US 8,230,488 B2
(45) Date of Patent: Jul. 24, 2012

(54) NETWORK SYSTEM, DIRECT-ACCESS METHOD, NETWORK HOUSEHOLD ELECTRICAL APPLIANCE, AND PROGRAM

(75) Inventors: Hiroyuki Chiba, Kanagawa (JP); Akihiko Kinoshita, Tokyo (JP); Takashi Kanao, Tokyo (JP)

(73) Assignee: Sony Corporation, Tokyo (JP)

( * ) Notice: Subject to any disclaimer, the term of this patent is extended or adjusted under 35 U.S.C. 154(b) by 850 days.

(21) Appl. No.: 12/328,729

(22) Filed: Dec. 4, 2008

(65) Prior Publication Data

US 2009/0178128 A1 Jul. 9, 2009

(30) Foreign Application Priority Data

Dec. 19, 2007 (JP) ................................. 2007-327736

(51) Int. Cl.
*H04L 29/00* (2006.01)
*H04L 29/02* (2006.01)
*G06F 15/16* (2006.01)
(52) U.S. Cl. .......................................... 726/7; 709/227
(58) Field of Classification Search .................. None
See application file for complete search history.

(56) References Cited

U.S. PATENT DOCUMENTS

| | | | | |
|---|---|---|---|---|
| 7,574,693 B1* | 8/2009 | Kemink | ........................ | 717/121 |
| 7,856,504 B2* | 12/2010 | Nomura et al. | ................. | 709/227 |
| 7,870,201 B2* | 1/2011 | Madams et al. | ............... | 709/206 |
| 2003/0182576 A1* | 9/2003 | Morlang et al. | ............... | 713/201 |
| 2006/0174105 A1* | 8/2006 | Park | .............................. | 713/155 |
| 2007/0136778 A1* | 6/2007 | Birger et al. | ................... | 725/117 |
| 2009/0097459 A1* | 4/2009 | Jendbro et al. | ................. | 370/338 |

FOREIGN PATENT DOCUMENTS

| | | |
|---|---|---|
| JP | 2006-109152 | 4/2006 |
| JP | 2007-318185 | 12/2007 |

* cited by examiner

*Primary Examiner* — Kambiz Zand
*Assistant Examiner* — William Powers
(74) *Attorney, Agent, or Firm* — Finnegan, Henderson, Farabow, Garrett & Dunner, L.L.P.

(57) ABSTRACT

A network system includes a first device, a second device, and a server device capable of registering the first and second devices in correlation and establishing an always-on connection session with the second device. The first device includes a callback request transmission section for transmitting a callback request containing designation information on the first device on a network to the server device. The server device includes a callback request relay section for transmitting the callback request from the first device to the second device through the connection session. The second device includes a direct-access session establishment request section for connecting with the first device through the network based on the designation information in the callback request received from the server device and transmitting a request for establishment of a session for direct access, and a direct-access communication section for communicating with the first device through the session for direct access.

7 Claims, 26 Drawing Sheets

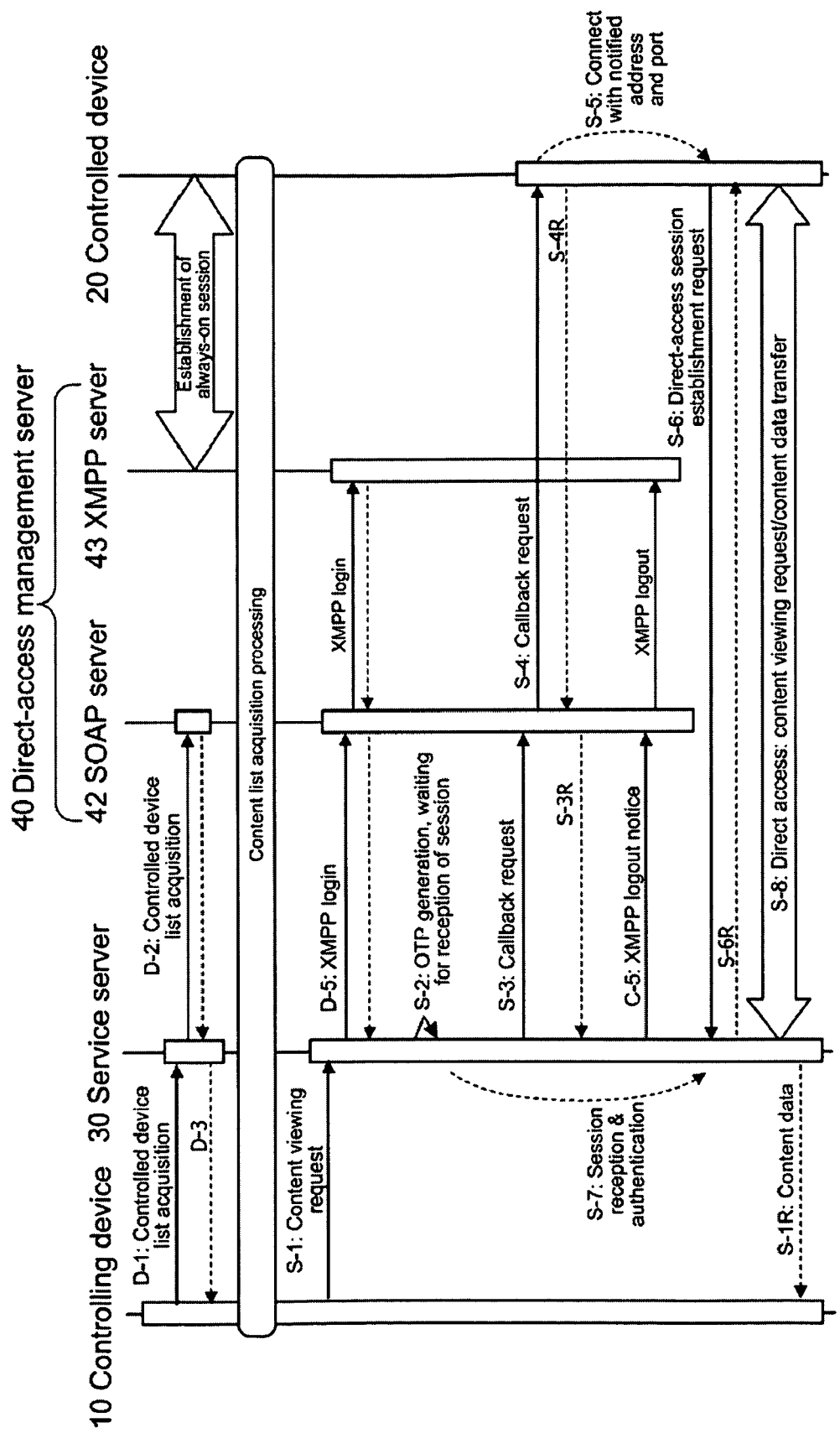

| No. | Outline of interface functions (key parameters) | Used protocol | Access I/F |
|---|---|---|---|
| D-1: Request<br>D-3: Response | Controlled device list acquisition<br>(request: user identification information<br>response: controlled device list) | HTTP(S) | [IF-01] |
| D-2: Request & response | Controlled device list acquisition<br>(request: service ID, controlling device/service management ID,<br>response: controlled device list) | SOAP/HTTP(S) | [IF-02] |
| S-1: Request<br>S-1R: Response | Video viewing request<br>(request: user identification information, controlled device number, content ID,<br>response: content data) | HTTP(S) | [IF-01] |
| D-5: Request & response | XMPP login<br>(request: service ID, controlling device/service management ID,<br>controlled device number, response: XMPP session ID | SOAP/HTTP(S) | [IF-02] |
| S-3: Request<br>S-3R: Response | Callback request<br>(request: service ID, controlling device/service management ID,<br>XMPP session ID, URN (content viewing), service server address,<br>service server port, OTP, response: request pass) | SOAP/HTTP(S) | [IF-02] |
| S-4: Request<br>S-4R: Response | Callback request<br>(request: URN (content viewing), service server address,<br>service server port, OTP<br>response: request pass) | XMP2P | [IF-07] |
| C-5: Request & response | XMPP logout notice<br>(request: service ID, controlling device/service management ID,<br>XMPP session ID, response: "nil") | SOAP/HTTP(S) | [IF-02] |
| S-6: Request<br>S-6R: Response | Direct-access session establishment request<br>(request: to service server address & service server port, OTP,<br>response: authentication result) | TCP (of its own) | [IF-31] |
| S-8: Request & response | Direct access<br>(request (service server T controlled device): to request pass, content ID<br>response (controlled device T service server): content data) | HTTP(S) | [IF-31]<br>Use of session<br>of S-6 |

FIG.5

Dev-ID0001@dap.sony.com/Product code-serial number

Bare JID | Resource

Full JID(D)

FIG.23

Dev-ID0001@dap.sony.com/Controlling device/service management ID-01234

Bare JID | Resource

Full JID(D)

FIG.24

| Content ID | Title name | Time | ... |
|---|---|---|---|
| 0x00000001 | Program A | 3600 sec. | ... |
| 0x000000a8 | Program B | 7200 sec. | ... |
| ... | ... | ... | ... |

| No. | Outline of interface functions (key parameters) | Used protocol | Access I/F |
|---|---|---|---|
| S-1: Request<br>S-1'R: Response | Content list acquisition request<br>(request: user identification information, controlling device number, retrieval condition, response: content list) | HTTP(S) | [IF-01] |
| D-5:<br>Request & response | XMPP login<br>(request: service ID, controlling device/service management ID, controlled device number,<br>response: XMPP session ID) | SOAP/HTTP(S) | [IF-02] |
| S-3: Request<br>S-3-R: Response | Callback request<br>(request: service ID, controlling device/service management ID, XMPP session ID, URN (content list acquisition), service server address, service server port, OTP,<br>response: request pass) | SOAP/HTTP(S) | [IF-02] |
| S-4: Request<br>S-4-R: Response | Callback request<br>(request: URN (content list acquisition), service server address, service server port, OTP,<br>response: request pass) | XMP2P | [IF-07] |
| C-5:<br>Request & response | XMPP logout notice<br>(request: service ID, controlling device/service management ID, XMPP session ID,<br>response: "Nil") | SOAP/HTTP(S) | [IF-02] |
| S-6: Request<br>S-6-R: Response | Direct-access session establishment request<br>(request: to service server address & service server port, OTP,<br>response: authentication result) | TCP (of its own) | [IF-31] |
| S-8:<br>Request & response | Direct access<br>(request (service server to controlled device): request pass, retrieval condition<br>response (controlled device T service server): content list) | HTTP(S) | [IF-31]<br>Use of session of S-6 |

FIG.28

NETWORK SYSTEM, DIRECT-ACCESS METHOD, NETWORK HOUSEHOLD ELECTRICAL APPLIANCE, AND PROGRAM

CROSS REFERENCES TO RELATED APPLICATIONS

The present invention contains subject matter related to Japanese Patent Application JP 2007-327736 filed in the Japanese Patent Office on Dec. 19, 2007, the entire contents of which being incorporated herein by reference.

BACKGROUND OF THE INVENTION

1. Field of the Invention

The present invention relates to a network system, a direct-access method, a network household electrical appliance, and a program that enable the network household electrical appliance to be controlled from a controlling device through a network.

2. Description of the Related Art

Examples of a method for access from a controlling device on the Internet to an in-home controlled device include a DDNS (Dynamic Domain Name System) method and a mail method.

In the DDNS, the in-home controlled device registers its own address in a DDNS server in advance and receives designation of a domain name and a port number from the controlling device on the Internet side. The controlling device can thus access the controlled device.

As a protocol for realizing real-time communication, an XMPP (extensible Messaging and Presence Protocol) is available (see Non-patent Document 1). One of real-time communication systems using this XMPP is instant messaging (IM) (see Non-patent Document 2). In the instant messaging (IM), it is checked whether an IM client (counterpart who can make IM exchange) is online on the Internet, and when the IM client is online, chatting, file exchange, and so on with the IM client can be performed.

Also, as a protocol for invoking data or a service in another computer, a SOAP (Simple Object Access Protocol) is available (see Non-patent Document 3). In communication using the SOAP, messages in each of which incidental information called an envelope is attached to an XML (eXtensible Markup Language) document are exchanged using a protocol such as an HTTP (Hyper Text Transfer Protocol). Since both a client using a service and a server providing the service have SOAP generation/interpretation engines, an object can be invoked between different environments.

As a system for establishing a session between a server and a client terminal and delivering a content from the server to the client terminal through a network, a system capable of, when the delivery of the content is interrupted by disconnection of the session, establishing a new session and restarting the delivery is known (see Patent Document 1).

[Non-patent Document 1] "Extensible Messaging and Presence Protocol (XMPP): Core", RFC3920, The Internet Engineering Task Force (IETF), October, 2004

[Non-patent Document 2] "Extensible Messaging and Presence Protocol (XMPP): Instant Messaging and Presence", RFC3921, The Internet Engineering Task Force (IETF), October, 2004

[Non-patent Document 3] "SOAP Version 1.2", W3C Recommendation, World Wide Web Consortium (W3C), June, 2003

[Patent Document 1] Japanese Patent Application Laid-Open No. 2003-050761

[Patent Document 2] Japanese Patent Application Laid-Open No. 2007-318185

SUMMARY OF THE INVENTION

Generally, in order to transfer large-volume data such as content data from a controlled device to a service server serving as a server device which provides a controlling device with various services for accessing the controlled device over a network, a session for direct access is established between the controlled device and the service server and the data is transferred without passing through a direct-access management server, whereby data transfer efficiency of the entire network is improved and an increase in the load on the direct-access management server is prevented.

In the establishment of the session for direct access between the controlled device and the service server, first, when the direct-access management server which manages a correspondence between a combination of the controlling device and the service of the service server and the controlled device receives a direct-access start request from the service server, the direct-access management server transmits a direct-access URI acquisition request to the controlled device through an always-on connection session. In response to the direct-access URI acquisition request from the direct-access management server, the controlled device assigns a direct-access local port and transmits a direct access port NAT (Network Address Translation) setting request containing a local IP address preassigned to the controlled device and the port number of the direct-access local port to a router, and requests the router to map a global IP address and port number, which are accessible through the Internet, to the local IP address and port number.

When receiving, as a NAT setting response, the global IP address and port number associated with the local IP address and port number of the controlled device from the router, the controlled device creates a direct-access URI list by using these global IP address and port number, and transmits the direct access URI list to the direct-access management server. The direct-access URI list refers to a list of URIs for direct access from the service server or the controlling device to the controlled device through the network. When receiving the direct-access URI list, the direct-access management server transmits it to the service server. Thus, thereafter, the service server performs processing for establishing the session for direct access to the controlled device by using a direct access URI.

However, since the above method is based on the premise that the router has a port forward function to cause each controlled device connected to an external network via the router to behave like a device having a global IP address, it has been difficult to establish the session for direct access between the controlled device and the service server when the router without the port forward function is used. Also in a double NAT environment, the controlled device cannot acquire the global IP address, thereby causing the same problem.

When the controlled device cannot acquire the global IP address and port number from the router, for example, as disclosed in Patent Document 2, by causing the direct-access management server to assign a tunneling port and using a direct-access URI list created by using the port number of the tunneling port and the global IP address of the direct-access management server, communication between the service server and the controlled device is performed in a tunneling mode via the direct-access management server. As a result, there arises a problem that the load on the direct-access management server increases.

In view of the above circumstances, it is desirable to provide a network system, a direct-access method, a network household electrical appliance, and a program which, if a global IP address can be assigned to a first device, enable establishment of a session for direct access between the first device and a second device which is the network household electrical appliance and improvement in the efficiency of the entire system, regardless of the presence or absence of an environment where a global IP address can be assigned to the second device.

According to an embodiment of the present invention, there is provided a network system including a first device, a second device, and a server device capable of registering the first device and the second device in association with each other and establishing an always-on connection session with the second device. The first device includes a callback request transmission means for transmitting a callback request containing designation information on the first device on a network to the server device. The server device includes a callback request relay means for transmitting the callback request from the first device to the second device through the always-on connection session. The second device includes a direct-access session establishment request means for connecting with the first device through the network on the basis of the designation information contained in the callback request received from the server device and transmitting a request for establishment of a session for direct access, and a direct-access communication means for communicating with the first device through the session for direct access.

According to the embodiment of the present invention, the second device is notified of the designation information on the first device to which the designation information on the network is assigned through the always-on connection session provided by the server device, and connects with the first device on the basis of the designation information to request the establishment of the session for direct access, so that the session for direct access can be established between the first device and the second device which is a network household electrical appliance regardless of the presence or absence of an environment where a global IP address can be assigned to the second device. In consequence, the frequency of occurrence of the situation in which large-volume data needs to be transferred in a tunneling mode between the devices via the server device is reduced, so that the load on the server device can be reduced.

It is also possible that the first device further includes a one-time password generation means for generating a one-time password, and a storage unit for storing the generated one-time password, the callback request transmission means transmits the callback request to which the one-time password generated by the one-time password generation means is added to the server device, the direct-access session establishment request means transmits the request for establishment of the session for direct access in which the one-time password contained in the callback request received from the server device is contained, and the first device further includes a direct-access session establishment response means for comparing the one-time password contained in the request for establishment of the session for direct access received from the second device and the one-time password stored in the storage unit and, when both the one-time passwords match, transmitting a response for the establishment of the session for direct access to the second device.

Thus, a correspondence relationship between each callback request from the first device and the request for establishment of the session for direct access from the second device can be recognized in the first device, and the session for direct access can be certainly established between two proper devices.

It is also possible that the first device further includes a judgment means for judging whether the designation information on the first device on the network is usable, the callback request transmission means transmits the callback request containing the designation information on the first device to the server device when the judgment means judges that the designation information on the first device is usable, and the first device further includes a designation information acquisition means for acquiring designation information on the second device on the network through the server device when the judgment means judges that the designation information on the first device is unusable, and a second direct-access communication means for connecting with the second device through the network on the basis of the designation information on the second device acquired by the designation information acquisition means and performing direct access.

According to this constitution, when it is judged that the designation information on the first device on the network can be specified, by transmitting the callback request containing the designation information on the first device from the first device to the second device through the always-on connection session provided by the server device, the second device connects with the first device on the basis of the designation information on the first device to request the establishment of the direct-access session, so that the direct-access session can be established, and when it is judged that the designation information on the first device cannot be specified, the first device acquires the designation information on the second device on the network through the always-on connection session provided by the server device and connects with the second device through the network on the basis of the acquired designation information to make direct access. Accordingly, even in an environment where it is not ensured that the designation information on the first device on the network can be specified, a situation where the direct access between the first device and the second device is possible can be provided with high probability. In other words, communication in a tunneling mode via the server device is stopped until only a situation where designation information on both the first device and the second device on the network cannot be specified occurs, whereby the load on the server device can be reduced.

The first device may be one of a controlling device and a service server which provides the controlling device with a service for controlling the second device via the network.

A direct-access method according to another embodiment of the present invention is a direct-access method for a network system including a first device, a second device, and a server device capable of registering the first device and the second device in association with each other and establishing an always-on connection session with the second device. The direct-access method includes: transmitting, by a callback request transmission means of the first device, a callback request containing designation information on the first device on a network to the server device; transmitting, by a callback request relay means of the server device, the callback request from the first device to the second device through the always-on connection session; connecting with, by a direct-access session establishment request means of the second device, the first device through the network on the basis of the designation information contained in the callback request received from the server device and transmitting a request for establishment of a session for direct access; and communicating with, by a direct-access communication means of the second device, the first device through the session for direct access.

A network household electrical appliance according to another embodiment of the present invention includes a callback request reception means for receiving, from a server device capable of registering a first device and a second device which is the network household electrical appliance in association with each other and establishing an always-on connection session with the second device, a callback request containing designation information on the first device on a network, a direct-access session establishment request means for connecting with the first device through the network on the basis of the designation information on the first device contained in the callback request received by the callback request reception means and transmitting a request for establishment of a session for direct access, and a direct-access communication means for communicating with the first device through the session for direct access.

A program according to another embodiment of the present invention is a program for causing a computer that function as a network household electrical appliance to function as: a callback request reception means for receiving, from a server device capable of registering a first device and a second device which is the network household electrical appliance in association with each other and establishing an always-on connection session with the second device, a callback request containing designation information on the first device on a network; a direct-access session establishment request means for connecting with the first device through the network on the basis of the designation information on the first device contained in the callback request received by the callback request reception means and transmitting a request for establishment of a session for direct access; and a direct-access communication means for communicating with the first device through the session for direct access.

According to another embodiment of the present invention, there is provided a network household electrical appliance including: a callback request reception section configured to receive, from a server device capable of registering a first device and a second device which is the network household electrical appliance in association with each other and establishing an always-on connection session with the second device, a callback request containing designation information on the first device on a network; a direct-access session establishment request section configured to connect with the first device through the network on the basis of the designation information on the first device contained in the callback request received by the callback request reception means and transmitting a request for establishment of a session for direct access; and a direct-access communication section configured to communicate with the first device through the session for direct access.

According to the embodiments of the present invention, if a global IP address can be assigned to the first device, the session for direct access can be established between the first device and the second device which is the network household electrical appliance regardless of the presence or absence of an environment where a global IP address can be assigned to the second device. Thus, the efficiency of the entire system can be improved.

These and other objects, features and advantages of the present invention will become more apparent in light of the following detailed description of best mode embodiments thereof, as illustrated in the accompanying drawings.

BRIEF DESCRIPTION OF DRAWINGS

FIG. 4 is a sequence diagram regarding processing of direct access from the controlled device;

FIG. 5 is a chart providing an outline of interface functions during the processing of direct access from the controlled device shown in FIG. 4;

FIG. 23 is a diagram showing a constitution of Full JID;

FIG. 24 is a diagram showing another constitution of Full JID;

FIG. 28 is a chart providing an outline of interface functions during the acquisition of the content list shown in FIG. 27.

DESCRIPTION OF PREFERRED EMBODIMENTS (First Embodiment)

An embodiment of the present invention will be described below with reference to the drawings.

Figure 1:
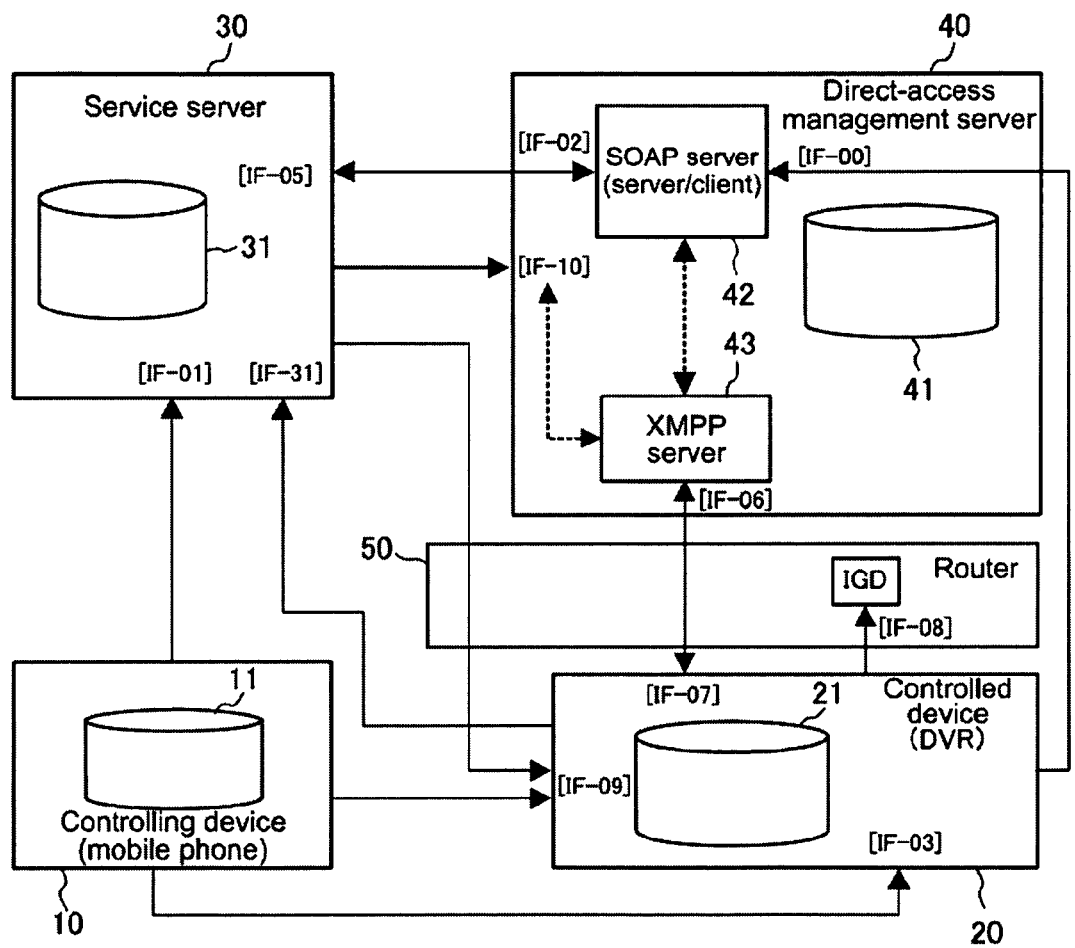
FIG. 1 is a diagram showing an overall configuration of a network system according to an embodiment of the present invention.

FIG. 1 is a diagram showing an overall configuration of a network system according to one embodiment of the present invention.

This network system includes a controlling device 10 such as a mobile phone, a controlled device 20 such as a DVR (Digital Video Recorder) which is a network household electrical appliance, a service server 30, a direct-access management server 40, and a router 50. In this embodiment, the service server 30 corresponds to a first device, and the controlled device 20 corresponds to a second device.

The controlling device 10 operates as a device for controlling the controlled device. The controlling device may be any device which can control the controlled device, and may be a PC (Personal Computer), a PDA (Personal Digital Assistant), or the like, instead of the mobile phone.

The controlling device 10 includes a main memory for storing programs and so on, a CPU (Central Processing Unit) for performing various types of computation processing by executing the programs stored in the main memory, an interface with the controlled device 20 such as the DVR, user interfaces such as a key input unit and a display unit, a nonvolatile storage unit 11, and so on. In the storage unit 11, user identification information registered with the controlling device 10 is stored. In the main memory, a program for performing processing related to direct access to the controlled device 20, and so on are stored.

The controlled device 20 includes not only a recording/reproducing function unit for recording/reproducing a content such as a broadcast program on/from a medium, but also a main memory for storing programs and so on, a CPU for performing various types of computation processing by executing the programs stored in the main memory, an interface with a network, an interface with the controlling device 10, a nonvolatile storage unit 21, a remote control receiver, an interface for connecting a TV or the like, and so on. In the storage unit 21, device authentication information fixedly assigned to the controlled device is previously stored. In the main memory, in addition to a program for controlling the recording/reproducing function unit of the controlled device 20, a program for performing processing related to direct access to the service server 30, and so on, are stored.

The service server 30 is a server device which provides the controlling device 10 with various services for accessing the controlled device 20 over the network. This service server 30 is implemented by using, for example, a standard computer system including, for example, an input unit such as a keyboard/mouse, a display unit, a main memory for storing programs and so on, a CPU for performing various types of computation processing by executing the programs stored in the main memory, a communication unit for communicating with the network, and a storage unit 31. In the main memory, in addition to a basic program necessary to operate the computer system, a program necessary to carry out the services, and so on are stored. In the storage unit 31, a service ID for identifying the service server and a service for each service provided by the service server 30 are stored.

The direct-access management server 40 is a server which manages a correspondence between a combination of the controlling device 10 and a service of the service server 30 and the controlled device 20. This direct-access management server 40 is implemented by using, for example, a standard computer system including, for example, an input unit such as a keyboard/mouse, a display unit, a main memory for storing programs and so on, a CPU for executing the programs stored in the main memory to perform various types of computation processing, an interface with the network, and a storage unit 41. In the main memory, in addition to a basic program necessary to operate the computer system, a program for causing the computer system to function as the direct-access management server, and so on are stored.

The direct-access management server 40 is provided with a SOAP (Simple Object Access Protocol) server 42 and an XMPP (eXtensible Messaging and Presence Protocol) server 43. The SOAP server 42 is a server for performing processing for registration of a combination of the controlling device 10 and a service, registration of the controlled device 20, and direct access between the service server 30 and the controlled device 20. The XMPP server 43 is a server for setting a two-way always-on connection session with the controlled device 20. The SOAP server 42 and the XMPP server 43 are merely examples, and therefore the SOAP server 42 can be replaced with a server using another API calling method, and the XMPP server 43 can be replaced with a server using another IM method.

Next, interfaces of the respective devices will be described. In FIG. 1, [IF-**] represents an interface number.

The SOAP server 42 in the direct-access management server 40 has an interface [IF-02] accessed from the service server 30 and an interface [IF-00] accessed from the controlled device 20. The SOAP server 42 also has a SOAP client function to access an interface [IF-05] of the service server 30. An interface of the XMPP server 43 is accessed from an XMPP client when an XMPP session is established. In this system configuration example, an interface [IF-06] accessed from the controlled device 20 corresponds to the interface of the XMPP server 43. After the XMPP session is established, messages can be exchanged in two ways by using the interface [IF-06], so that the XMPP server 43 can also access an interface [IF-07] of the controlled device 20.

The service server 30 has an interface [IF-01] accessed from the controlling device 10, an interface [IF-05] accessed from the direct-access management server 40, and an interface [IF-31] accessed from the controlled device 20.

In this system configuration example, the service server 30 is not directly interfaced with the XMPP server 43 in the direct-access management server 40, but of course may be directly interfaced therewith.

The controlled device 20 has the interface [IF-07] accessed from the direct-access management server 40 after the establishment of the XMPP session, an interface [IF-03] for transmitting/receiving data to/from the controlling device 10 via, for example, infrared rays or a USB (Universal Serial Bus), and an interface [IF-09] that is accessed from the service server 30 or the controlling device 10 and supports a direct-access URI.

The router 50 has an interface [IF-08] having a UPnP (Universal Plug and Play) IGD (Internet Gateway Device) function and accessed from the controlled device 20.

Next, the operation of the network system of this embodiment will be described. In the following description, <X-XX> represents a request, and <X-XXR> represents a response to <X-XX>.

[1. Registrations of Controlling Device/Service and Controlled Device]

First, the operation of liking a controlling device/service management ID issued for each combination of the controlling device 10 and a service to a controlled device management ID uniquely issued for each of the controlled devices 20 in the direct-access management server 40 will be described.

Figure 2:
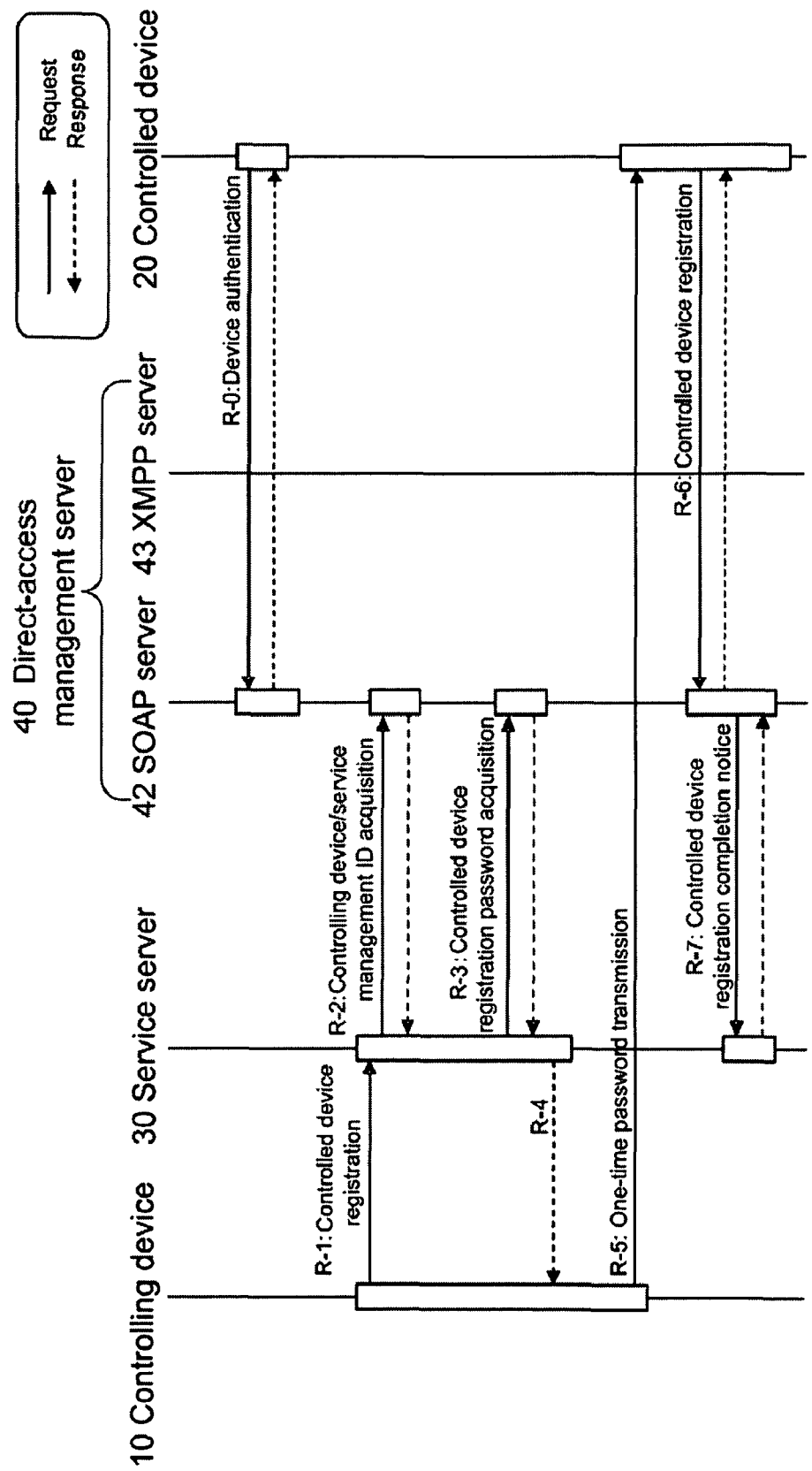
FIG. 2 is a sequence diagram showing the flow of information in the registration of a combination of a controlling device and a service and the registration of a controlled device in the network system shown in FIG. 1.
Figure 6:
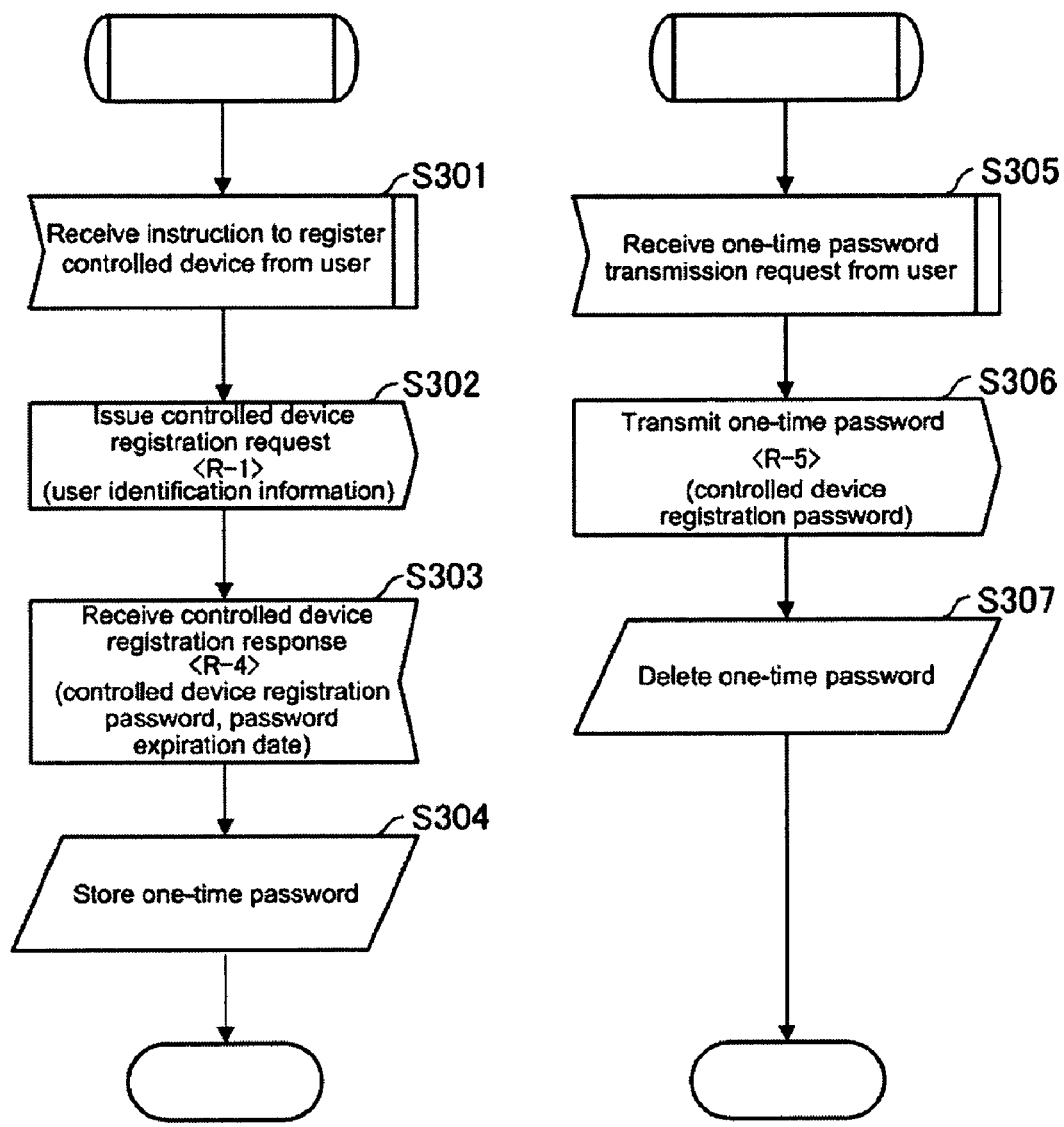
FIG. 6 is a flowchart of the controlling device in the registration of the combination of the controlling device and the service and the registration of the controlled device.
Figure 7:
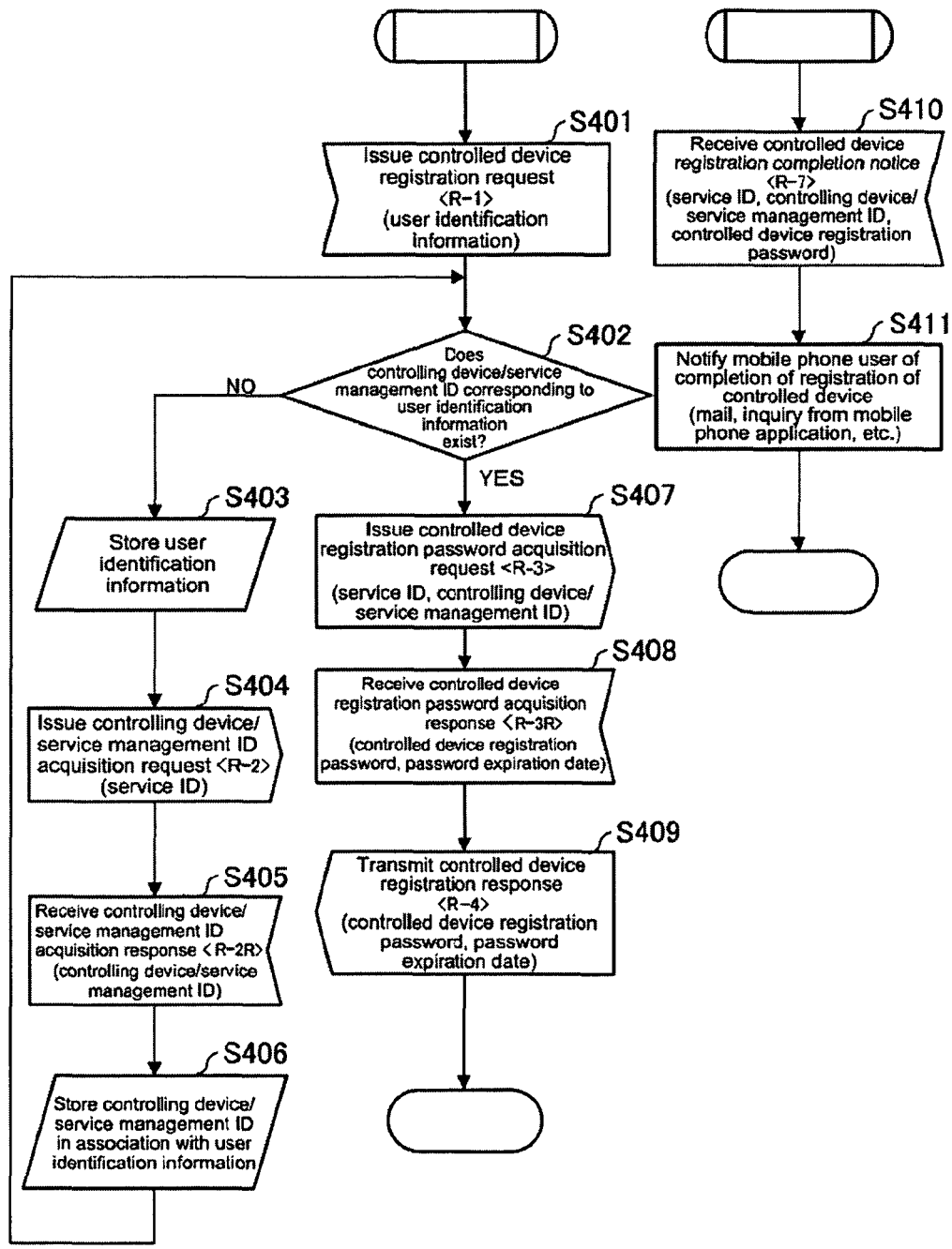
FIG. 7 is a flowchart of a service server in the registration of the combination of the controlling device and the service and the registration of the controlled device.
Figure 8:
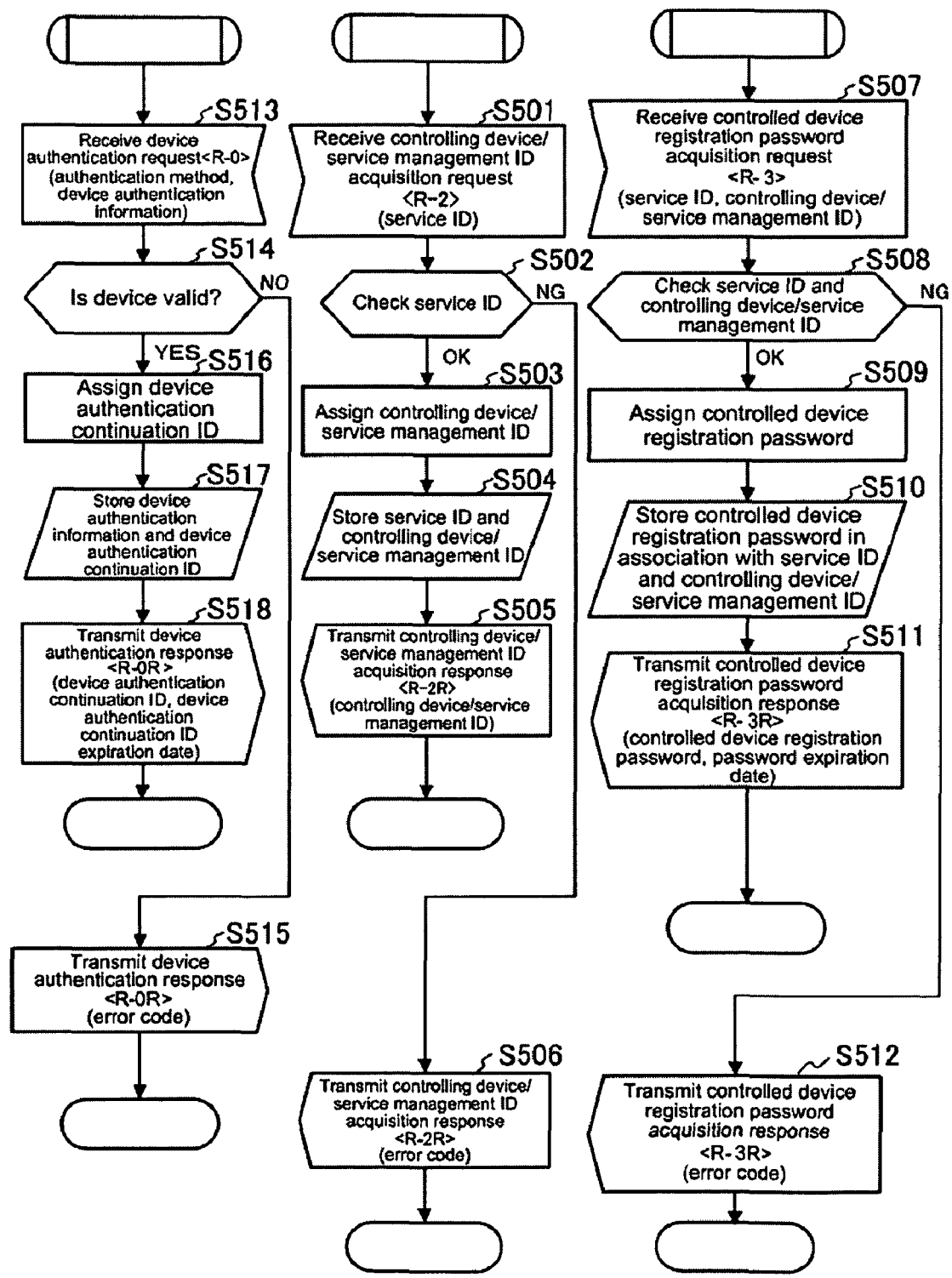
FIG. 8 is a flowchart of a direct-access management server in the registration of the combination of the controlling device and the service and the registration of the controlled device.
Figure 9:
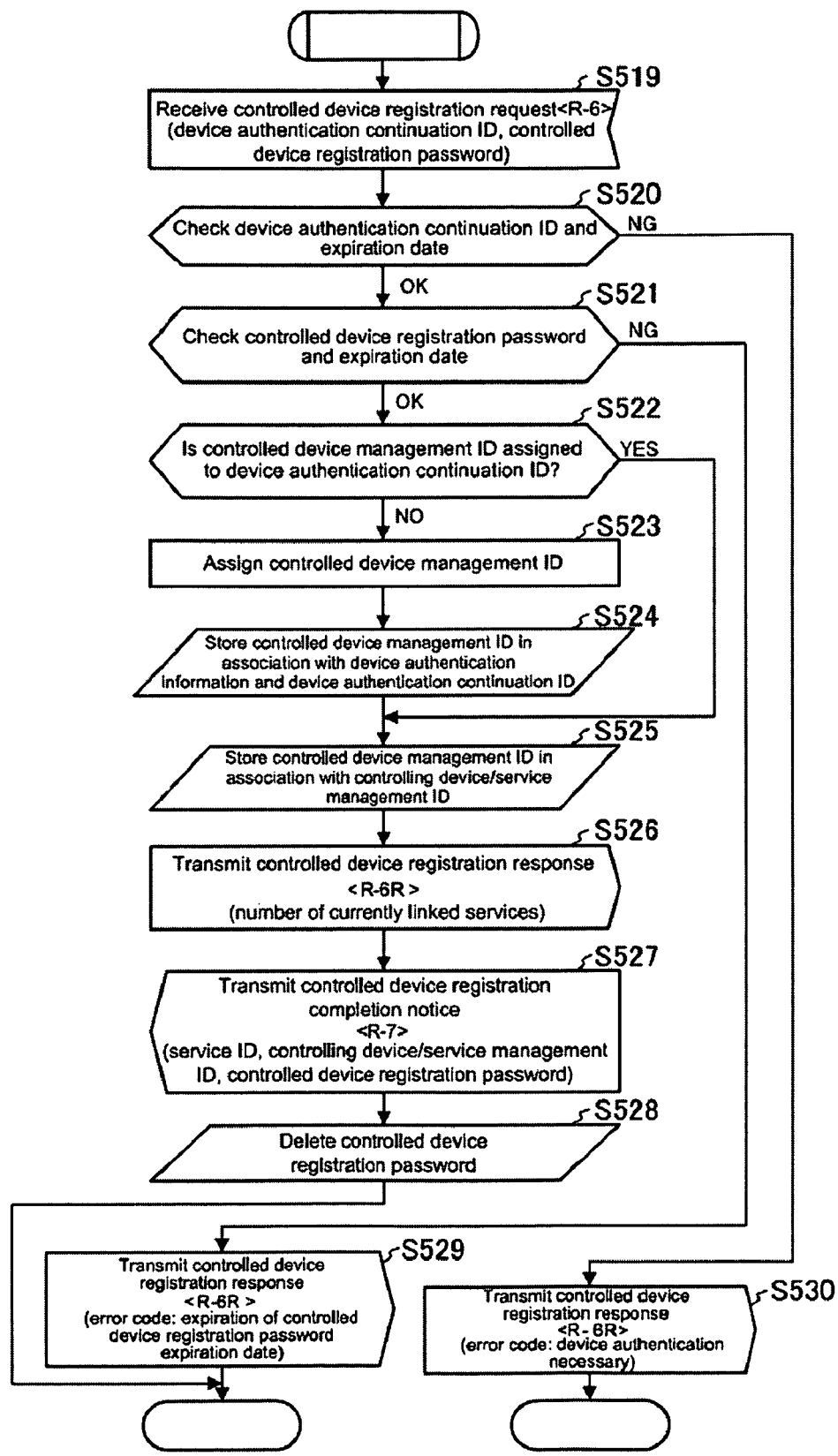
FIG. 9 is a flowchart of the direct-access management server in the registration of the controlled device.
Figure 10:
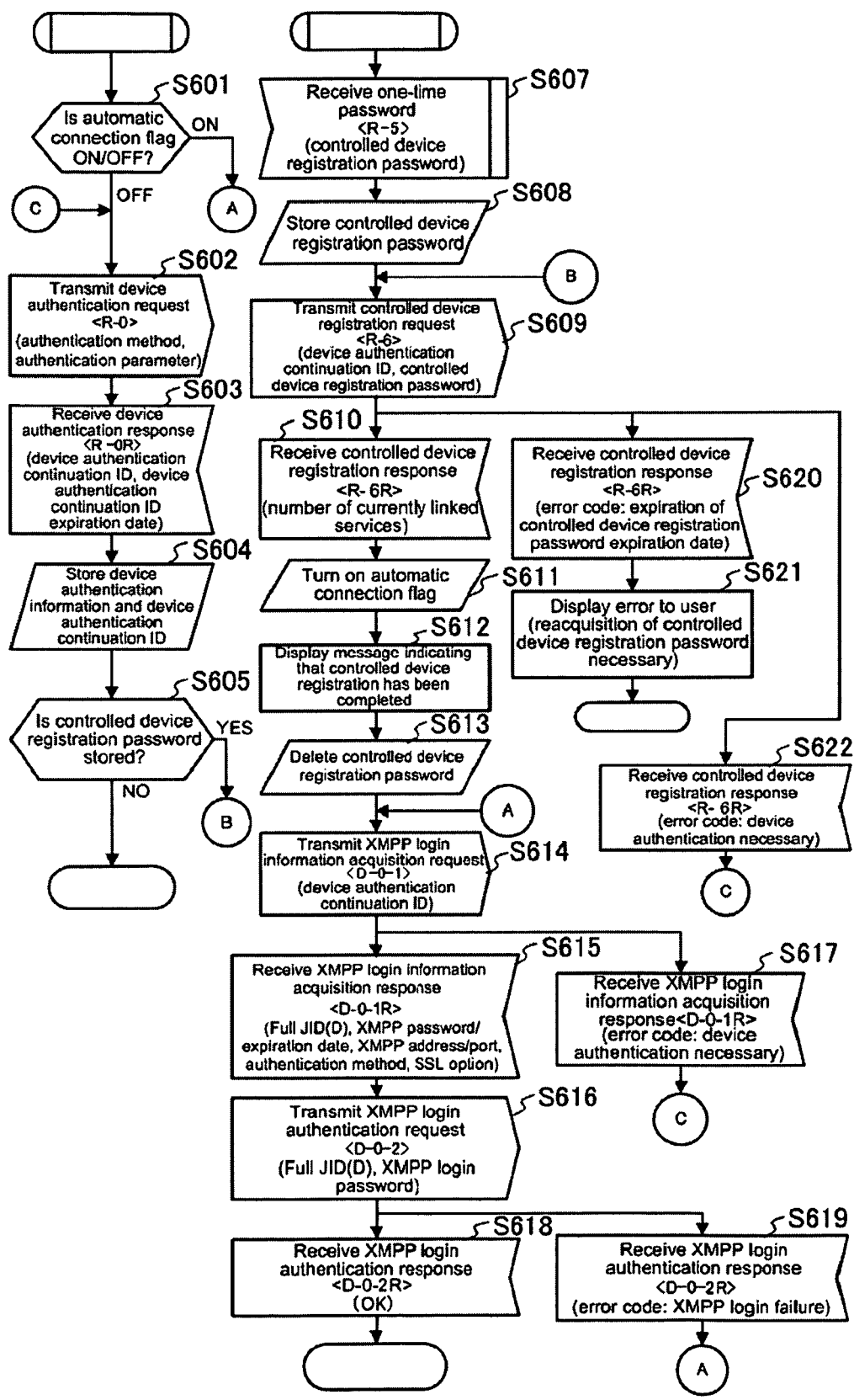
FIG. 10 is a flowchart of the controlled device in the registration of the controlled device.

FIG. 2 is a sequence diagram showing the flow of information in registering a combination of the controlling device 10 and a service and in registering the controlled device 20. FIG. 6 is a flowchart of the controlling device 10 in the above-mentioned registrations. FIG. 7 is a flowchart of the service server 30 in the registrations. FIG. 8 and FIG. 9 are flowcharts of the direct-access management server 40 in the registrations. FIG. 10 is a flowchart of the controlled device 20 in the registrations.

[1-1. Registration of Combination of Controlling Device and Service]

First, the controlling device 10 receives an instruction to register the controlled device from a user (step S301 in FIG. 6) and issues a controlled device registration request <R-1> containing user identification information to the service server 30 (step S302 in FIG. 6).

When receiving the controlled device registration request <R-1> containing the user identification information (step S401 in FIG. 7), the service server 30 judges whether a controlling device/service management ID corresponding to the user identification information is stored in the storage unit 31 (step S402 in FIG. 7).

When the controlling device/service management ID corresponding to the user identification information is not stored, the service server 30 stores the user identification information in the storage unit 31 (step S403 in FIG. 7) and issues a controlling device/service management ID acquisition request <R-2> containing a service ID preassigned to the service server 30 to the SOAP server 42 in the direct-access management server 40 (step S404 in FIG. 7). The controlling device/service management ID is an ID uniquely assigned to a combination of each service provided by a service provider and a controlling device.

When receiving the controlling device/service management ID acquisition request <R-2> (step S501 in FIG. 8), the SOAP server 42 checks whether the service ID contained therein matches a service ID pre-registered in the storage unit 41 of the direct-access management server 40 (step S502 in FIG. 8). When the service ID does not match the pre-registered service ID, the SOAP server 42 transmits, as a controlling device/service management ID acquisition response <R-2R>, an error code indicating that the service ID is not registered to the service server 30 (step S506 in FIG. 8). When the service ID matches the pre-registered service ID, the SOAP server 42 issues a new controlling device/service management ID (step S503 in FIG. 8), registers a correspondence relationship between this controlling device/service management ID and the service ID in the storage unit 41 (step S504 in FIG. 8), and transmits, as the controlling device/service management ID acquisition request <R-2R>, this controlling device/service management ID to the service server 30 (step S505 in FIG. 8). Thus, the direct-access management server 40 can identify the controlling side viewed from the direct-access management server 40 by using a combination of the controlling device 10 and the service of the service server 30 used by the controlling device 10.

It should be noted that the direct-access management server 40 stores site information such as the URI of the service server 30 in the storage unit 41 in association with the controlling device/service management ID and the service ID to manage the site information.

When receiving the controlling device/service management ID as the controlling device/service management ID acquisition response <R-2R> (step S405 in FIG. 7), the service server 30 registers the controlling device/service management ID in the storage unit 31 in association with the user identification information (step S406 in FIG. 7). By storing the controlling device/service management ID in association with the user identification information, when thereafter being accessed from the controlling device 10, the service server 30 requests the direct-access management server 40 to perform processing by using the controlling device/service management ID corresponding to the user identification information on the controlling device 10 to enable the direct-access management server 40 to uniquely identify a control-request source as the controlling side of the combination of the controlling device 10 and the service of the service server 30.

After the service server 30 registers the controlling device/service management ID in the storage unit 31 in association with the user identification information or when the controlling device/service management ID corresponding to the user identification information contained in the controlled device registration request <R-1> received from the controlling device 10 is registered in the storage unit 31, the service server 30 issues a controlled device registration password acquisition request <R-3> containing these controlling device/service management ID and service ID to the SOAP server 42 in the direct-access management server 40 (step S407 in FIG. 7).

When receiving the controlled device registration password acquisition request <R-3> (step S507 in FIG. 8), the SOAP server 42 in the direct-access management server 40 judges whether a combination of the controlling device/service management ID and the service ID contained therein is registered in the storage unit 41 (step S508 in FIG. 8). When the combination is not registered, the SOAP server 30 transmits, as a controlled device registration password acquisition response <R-3R>, an error code indicating that the combination of the controlling device/service management ID and the service ID is not registered to the service server 30 (step S512 in FIG. 8). When the combination of the controlling device/service management ID and the service ID contained in the controlled device registration password acquisition request <R-3> is already registered in the storage unit 41, the SOAP server 42 newly generates a controlled device registration password (step S509 in FIG. 8) and registers this controlled device registration password and information on an expiration date specified for the controlled device registration password in the storage unit 41 in association with the controlling device/service management ID and the service ID which are contained in the controlled device registration password acquisition request <R-3> (step S510 in FIG. 8). Then, the SOAP server 42 transmits, as a controlled device registration password acquisition response <R-3R>, the controlled device registration password and the information on the expiration date of the controlled device registration password to the service server 30 (step S511 in FIG. 8).

When receiving the controlled device registration password acquisition response <R-3R> (step S408 in FIG. 7), the service server 30 transmits, as a controlled device registration response <R-4>, the controlled device registration password and the information on the expiration date thereof contained in the controlled device registration password acquisition response <R-3R> to the controlling device 10 (step S409 in FIG. 7).

When receiving the controlled device registration response <R-4> (step S303 in FIG. 6), the controlling device 10 stores the controlled device registration password and the information on the expiration date thereof contained in the controlled device registration response <R-4> in the storage unit 11 (step S304 in FIG. 6).

Thus, the processing of registering the controlling device/service management ID with respect to the combination of the controlling device 10 and the service and the processing of issuing the controlled device registration password used for associating the controlled device 20 with the controlling device 10 are completed.

[1-2. Registration of Controlled Device]

Next, the operation of the controlled device 20 in the registration will be described.

Before being used by the user, the controlled device 20 performs the device authentication of the controlled device 20 itself in the direct-access management server 40 as follows.

First, the controlled device 20 checks the value of an automatic connection flag (step S601 in FIG. 10). Before the controlled device is registered with the direct-access management server 40, the value of the automatic connection flag is off. In this case, the controlled device 20 transmits a device authentication request <R-0> containing information on a preset authentication method and device authentication information to the SOAP server 42 in the direct-access management server 40 (step S602 in FIG. 10).

When receiving the device authentication request <R -0> from the controlled device 20 (step S513 in FIG. 8), the SOAP server 42 in the direct-access management server 40 judges whether the controlled device 20 is a proper device according to the information on the authentication method and the device authentication information contained in the device authentication request <R-0> (step S514 in FIG. 8). When it is judged that the controlled device 20 is an improper device, that is, when the authentication method is different from a predetermined authentication method or the device authentication information has a format different from that of the predetermined authentication method, the SOAP server 42 transmits, as a device authentication response <R-0R>, a message indicating that an error code is shown to the direct-access management server 40 to the controlled device 20 (step S515 in FIG. 8). When it is judged that the controlled device 20 is the proper device, that is, when the authentication method matches the predetermined authentication method and the device authentication information has the format of the predetermined authentication method, the SOAP server 42 generates a device authentication continuation ID to be assigned to the controlled device 20 (step S516 in FIG. 8), and stores the device authentication continuation ID in the storage unit 41 in association with the device authentication information contained in the device authentication request <R-0> (step S517 in FIG. 8). After that, the SOAP server 42 transmits the device authentication response <R-0R> containing the generated device authentication continuation ID and information on the expiration date thereof to the controlled device 20 (step S518 in FIG. 8). The device authentication continuation ID is identification information assigned to a device which has been authenticated by the direct-access management server 40. Using the identification information, the direct-access management server 40 can recognize the device authentication status of the controlled device 20.

When receiving the device authentication response <R-0R> containing the device authentication continuation ID and the information on the expiration date thereof from the SOAP server 42 in the direct-access management server 40 (step S603 in FIG. 10), the controlled device 20 stores the device authentication continuation ID and the information on the expiration date thereof contained in the device authentication response <R-0R> in the storage unit 21 in association with the device authentication information (step S604 in FIG. 10).

After that, the controlled device 20 judges whether the controlled device registration password is stored in the storage unit 21 (step S605 in FIG. 10). When the controlled device registration password is not stored, the operation is terminated, while when the controlled device registration password is stored, the processing proceeds to step S609. Since no controlled device registration password is stored immediately after the device authentication continuation ID is acquired, the operation is terminated in this case.

Up to this point, the controlled device 20 stores a combination of the device authentication continuation ID, the information on the expiration date of the device authentication continuation ID, and the device authentication information in the storage unit 21, the direct-access management server 40 stores a combination of the device authentication continuation ID and the device authentication information in the storage unit 41, and thus the registration of the controlled device 20 with the direct-access management server 40 is completed.

[1-3. Linking of Controlling Device/Service Management ID to Controlled Device Management ID]

Next, the operation of registering the controlling device/service management ID and the controlled device management ID with the direct-access management server 40 in association with each other is carried out. In the controlling device 10, a one-time password transmission request is inputted from the user (step S305 in FIG. 6). When receiving the one-time password transmission request from the user, the controlling device 10 transfers, as a one-time password <R-5>, the controlled device registration password stored in the storage unit 11 to the controlled device 20 by using the interface [IF-03] of an infrared type or USB type (step S306 in FIG. 6). Other possible methods for transferring the controlled device registration password include transfer via a contactless IC card, wireless transmission using Bluetooth (trademark), wireless LAN, or the like, but any transfer method may be used as long as the controlled device registration password can be transferred from the controlling device 10 serving as the controlling device to the controlled device 20. After that, the controlling device 10 deletes the controlled device registration password from the storage unit 11 (step S307 in FIG. 6).

When receiving the controlled device registration password <R-5> from the controlling device 10 (step S607 in FIG. 10), the controlled device 20 stores the controlled device registration password in the storage unit 21 (step S608 in FIG. 10). Subsequently, the controlled device 20 transmits a controlled device registration request <R-6> containing the device authentication continuation ID stored in the storage unit 21 and the controlled device registration password received from the controlling device 10 to the SOAP server 42 in the direct-access management server 40 (step S609 in FIG. 10). Thus, the controlled device 20 requests the direct-access management server 40 to register the controlled device registration password in association with the controlling device 10 which has transmitted the controlled device registration password.

When receiving the controlled device registration request <R-6> from the controlled device 20 (step S519 in FIG. 9), the SOAP server 42 in the direct-access management server 40 checks whether the device authentication continuation ID contained in the controlled device registration request <R-6> matches one that is stored in the storage unit 41 and also checks the expiration date of the device authentication continuation ID (step S520 in FIG. 9). When the result of the checking is judged as NG, that is, when the device authentication continuation ID does not match the stored one or when the expiration date of the device authentication continuation ID has passed, the SOAP server 42 transmits a controlled device registration response <R-6R> containing an error code indicating that device authentication is necessary to the controlled device 20 (step S530 in FIG. 9). When receiving the controlled device registration response <R-6R> containing the error code (step S622 in FIG. 10), the controlled device 20 returns to step S602 and repeats the processing for device authentication.

When the result of the checking in step S520 is OK, that is, when the device authentication continuation ID matches one that is stored in the storage unit 41 and the expiration date of the device authentication continuation ID has not yet passed, the SOAP server 42 checks whether the controlled device registration password contained in the controlled device registration request <R-6> received from the controlled device 20 matches one that is stored in the storage unit 41 and also checks the expiration date of the controlled device registration password (step S521 in FIG. 9). When the result of the checking is judged as NG, that is, when the controlled device registration password does not match the stored one or when the expiration date of the controlled device registration password has passed, the SOAP server 42 transmits, as the controlled device registration response <R-6R>, an error code indicating that the controlled device registration password contained in the controlled device registration request <R-6> is invalid to the controlled device 20 (step S529 in FIG. 9). When receiving the error code as the controlled device registration response <R-6R> (step S620 in FIG. 10), the controlled device 20 displays an error message to the user (step S621 in FIG. 10) through a screen of a TV connected to the controlled device 20 or the like such that the controlled device registration password is acquired again and ends the processing.

When the result of the checking in step S521 is OK, that is, when the controlled device registration password matches one that is stored in the storage unit 41 and when the expiration date of the controlled device registration password has not yet passed, the SOAP server 42 judges whether a controlled device management ID is assigned to the device authentication continuation ID contained in the controlled device registration request <R-6> with reference to information stored in the storage unit 41 (step S522 in FIG. 9). When the controlled device management ID corresponding to the device authentication continuation ID has not been assigned yet, the SOAP server 42 assigns a controlled device management ID to the controlled device 20 (step S523 in FIG. 9) and stores the assigned controlled device management ID in the storage unit 41 in association with the device authentication information and the device authentication continuation ID of the controlled device 20 (step S524 in FIG. 9). When the controlled device management ID has already been assigned to the device authentication continuation ID contained in the controlled device registration request <R-6>, the SOAP server 42 stores the controlled device management ID in the storage unit 41 in association with the controlling device/service management ID stored in the storage unit 41 in association with the controlled device registration password (step S525 in FIG. 9). Herein, the controlled device management ID refers to identification information uniquely assigned to the controlled device in the direct-access management server 40. With the use thereof, the controlling device/service management ID assigned to a combination of the controlling device and the service and the controlled device management ID assigned to the controlled device are linked to each other. In this case, a plurality of controlled device management IDs may be linked to one controlling device/service management ID, or conversely a plurality of controlling device/service management IDs may be linked to one controlled device management ID.

Then, the SOAP server 42 transmits, as the controlled device registration response <R-6R>, the number of currently linked services to the controlled device 20 (step S526 in FIG. 9). Next, the SOAP server 42 transmits a controlled device registration completion notice <R-7> containing the service ID, the controlling device/service management ID, and the controlled device registration password which are stored in the storage unit 41 to the service server 30 (step S527 in FIG. 9). After that, the SOAP server 42 deletes the controlled device registration password in the storage unit 41 (step S528 in FIG. 9) and ends the processing. On the other hand, when receiving the controlled device registration completion notice <R-7> from the SOAP server 42 (step S410 in FIG. 7), the service server 30 notifies the user of the controlling device 10 of the completion of registration of the controlled device by e-mail or the like (step S411 in FIG. 7).

When receiving the number of currently linked services as the controlled device registration response <R-6R> from the SOAP server 42 (step S610 in FIG. 10), the controlled device 20 turns on an automatic connection flag (step S611 in FIG. 10) and displays a message indicating that the registration of the controlled device has been completed (step S612 in FIG. 10). Subsequently, the controlled device 20 deletes the controlled device registration password stored in the storage unit 21 (step S613 in FIG. 10). After that, to establish an always-on connection session with the XMPP server 43 in the direct-access management server 43, the controlled device 20 transmits an XMPP login information acquisition request <D-0-1> containing the device authentication continuation ID to the SOAP server 42 in the direct-access management server 40 (step S614 in FIG. 10).

[2. XMPP Login of Controlled Device]

In this network system, the direct-access management server 40 includes the XMPP server 43 for setting the two-way always-on connection session with the controlled device 20. In order for the controlling device 10 serving as the controlling device to access the controlled device 20 through the network, the controlled device 20 logs into the XMPP server 43 before the access to establish the always-on connection session with the XMPP server 43. Thus, the service server 30 and the controlling device 10 can acquire necessary information from the controlled device 20 when necessary. To simplify the design of the service server 30 in this case, an XMPP protocol is hidden in the direct-access management server 40, so that only an SOAP interface can exchange information with the XMPP server 43 which has established the two-way always-on connection session with the controlled device 20.

Figure 3:
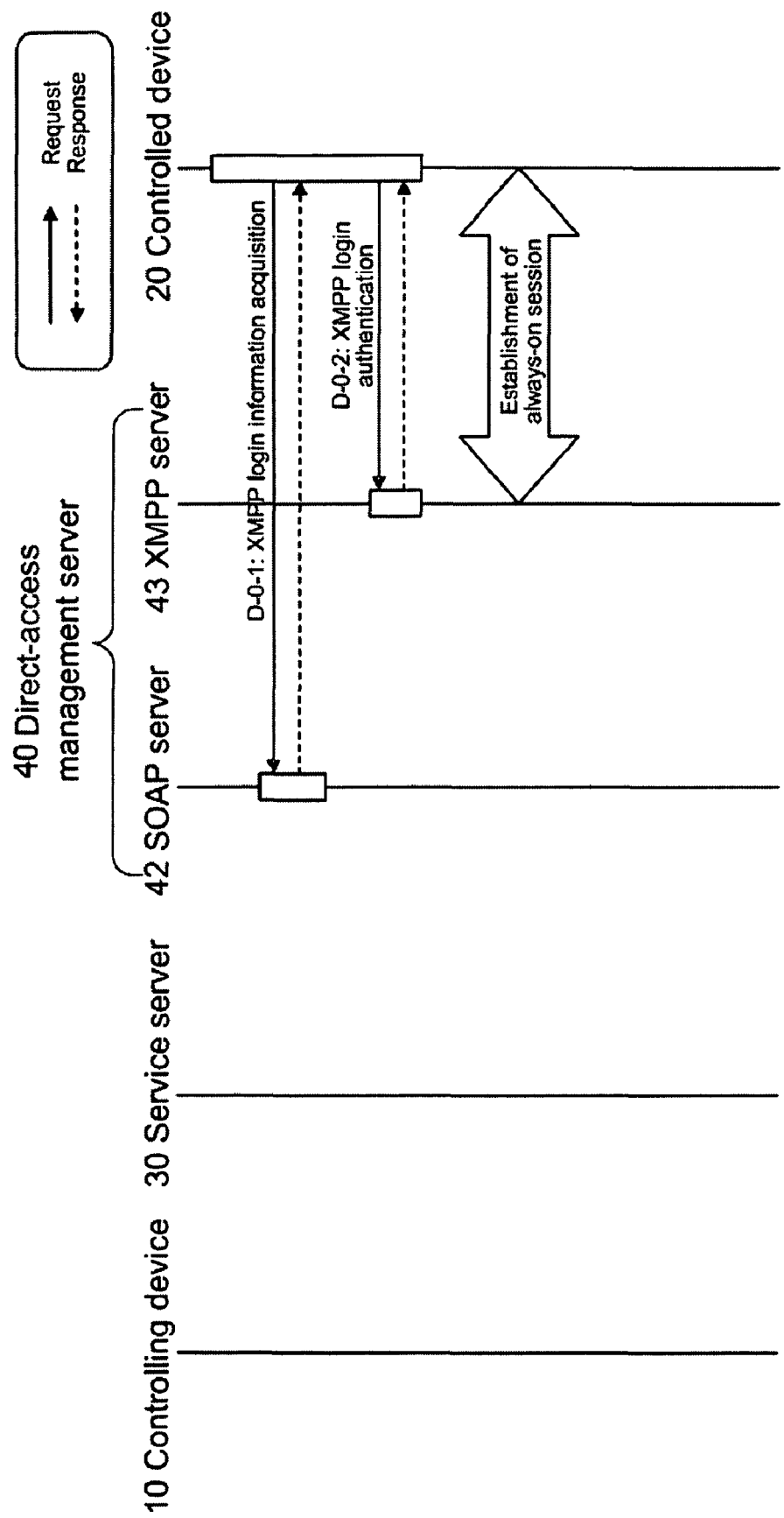
FIG. 3 is a sequence diagram showing the flow of information on XMPP login of the controlled device.
Figure 11:
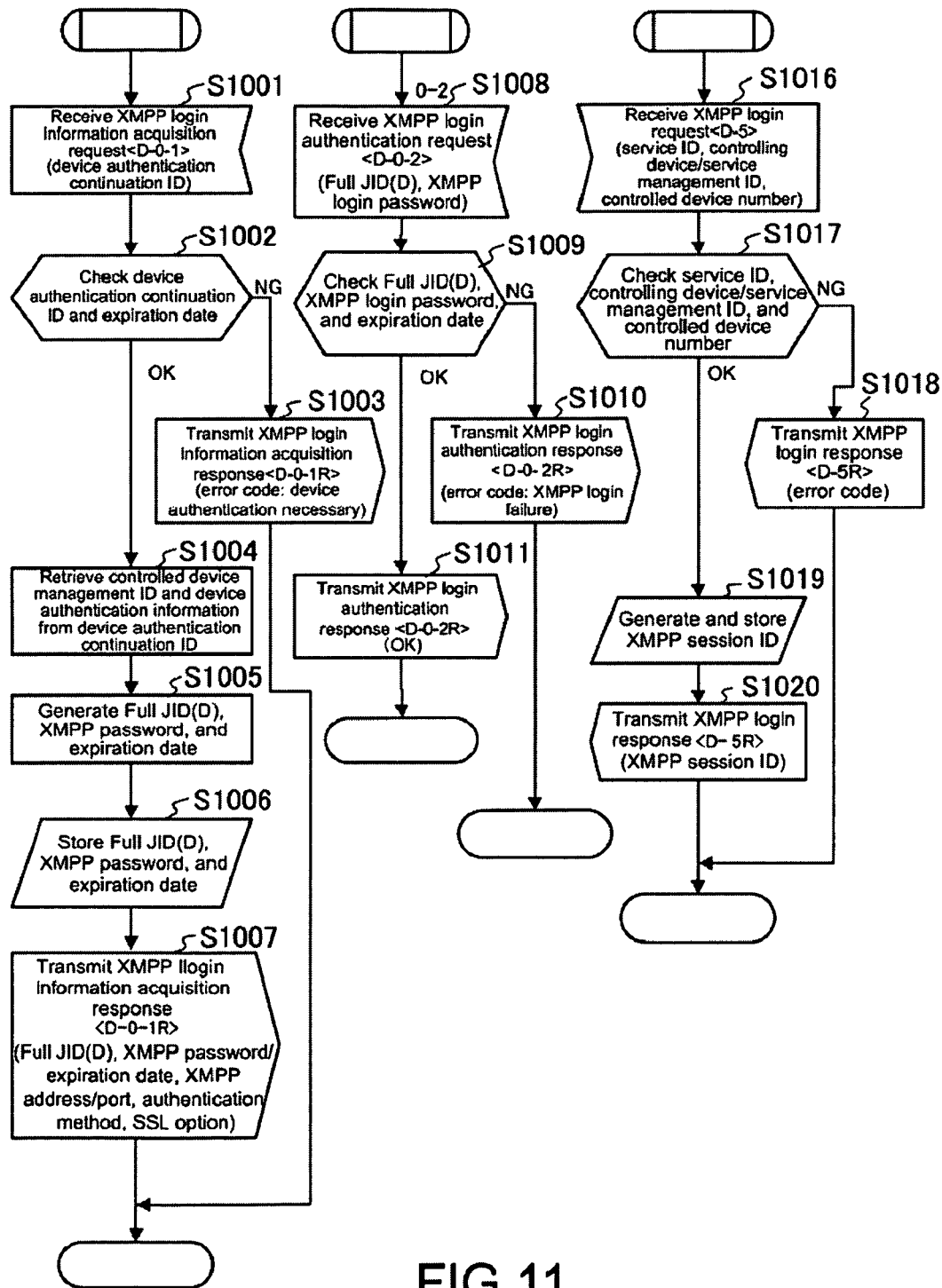
FIG. 11 is a flowchart showing the operation of the direct-access management server during the XMPP login of the controlled device.

FIG. 3 is a sequence diagram showing the flow of information on the XMPP login of the controlled device 20. FIG. 11 is a flowchart showing the operation of the direct-access management server 40 during the XMPP login of the controlled device 20.

When receiving the XMPP login information acquisition request <D-0-1> containing the device authentication continuation ID from the controlled device 20 (step S1001 in FIG. 11), the direct-access management server 40 checks the device authentication continuation ID contained in the XMPP login information acquisition request <D-0-1> and the expiration date of the device authentication continuation ID (step 1002 in FIG. 11). In this checking, when the device authentication continuation ID contained in the XMPP login information acquisition request <D-0-1> does not match one that is stored in the storage unit 41 of the direct-access management server 40 or when the expiration date has passed, this means that the controlled device 20 is not properly registered with the direct-access management server 40 or the controlled device 20 was registered in the past but the expiration date of the device authentication continuation ID at the time of the registration has passed. Therefore, the direct-access management server 40 transmits, as an XMPP login information acquisition response <D-0-1R>, an error code indicating that device authentication is necessary to the controlled device 20 (step S1003 in FIG. 11). When the device authentication continuation ID is stored in the storage unit 41 and the expiration period of the device authentication continuation ID has not yet passed, the direct-access management server 40 retrieves the controlled device management ID and the device authentication information which are linked to this device authentication continuation ID from the storage unit 41 (step S1004 in FIG. 11). Based on these controlled device management ID and device authentication information, the controlled device 20 generates information on Full JID(D) that is an XMPP login ID necessary to log into the XMPP server 43, an XMPP login password, and the expiration date of the XMPP login password (step S1005 in FIG. 11) and stores these pieces of information in the storage unit 41 (step S1006 in FIG. 11). The direct-access management server 40 transmits, as the XMPP login information acquisition response <D-0 -1R>, information obtained by adding an XMPP address, a port number, authentication method information, and an SSL (Secure Socket Layer) option to the generated information on the Full JID(D), the XMPP login password, and the expiration date thereof to the controlled device 20 (step S1007 in FIG. 11).

When receiving the XMPP login information acquisition response <D-0-1R> containing the Full JID(D), the XMPP login password, and so on from the SOAP server 42 in the direct-access management server 40 (step S615 in FIG. 10), the controlled device 20 transmits an XMPP login authentication request <D-0-2> containing the Full JID(D) and the XMPP login password to the XMPP server 43 in the direct-access management server 40 (step S616 in FIG. 10).

When receiving the XMPP login authentication request <D-0-2> from the controlled device 20 (step S1008 in FIG. 11), the XMPP server 43 in the direct-access management server 40 checks the Full JID(D), the XMPP login password, and the expiration date of the XMPP login password contained in the XMPP login authentication request <D-0-2> (step S1009 in FIG. 11), and when the Full JID(D) does not match one that is stored in the storage unit 41, when the XMPP login password does not match one that is stored in the storage unit 41, or when the expiration date of the XMPP login password has passed, the XMPP server 43 transmits, as an XMPP login authentication response <D-0-2R>, an error code indicating the XMPP login has failed to the controlled device 20 (step S1010 in FIG. 11). When all the check results of the Full JID(D), the XMPP login password and the expiration date are OK, the XMPP server 43 in the direct-access management server 40 transmits, as the XMPP login authentication response <D-0-2R>, a code indicating that the XMPP login is permitted to the controlled device 20 (step S1011 in FIG. 11).

When receiving, as the XMPP login authentication response <D-0-2R>, the error code indicating the XMPP login has failed from the direct-access management server 40 (step S619 in FIG. 10), the controlled device 20 returns to step S614 and makes again the XMPP login information acquisition request. More specifically, since the expiration date of the XMPP login password may have passed, the controlled device 20 performs again the processing for XMPP login information acquisition request. When receiving, as the XMPP login authentication response <D-0-2R>, the code indicating that the XMPP login is permitted from the direct-access management server 40 (step S618 in FIG. 10), the controlled device 20 completes the XMPP login processing.

When the controlled device 20 receives, as the XMPP login information acquisition response <D-0-1R>, the error code indicating that device authentication is necessary from the SOAP server 42 in the direct-access management server 40 (step S617 in FIG. 10), the controlled device 20 may not be properly registered with the direct-access management server 40 or the expiration date of the device authentication continuation ID may have passed. Therefore, the controlled device 20 retransmits the device authentication request <R-0> containing the information on the authentication method and the device authentication information which are preset in the controlled device 20 to the SOAP server 42 in the direct-access management server 40 to perform again the device authentication of the controlled device 20 (step S602 in FIG. 10).

As described above, in this network system, the direct-access management server 40 generates the XMPP login ID (Full JID) and the XMPP login password which are necessary for the controlled device 20 to log into the XMPP server 43 and delivers them to the controlled device 20. For example, as shown in FIG. 23, the Full JID is constituted by a Bare JID portion and a Resource portion.

The controlled device management ID assigned to the controlled device is used for the Bare JID portion, and a product code and a serial number obtained from the device authentication information are used for the Resource portion. Moreover, as shown in FIG. 24, the controlling device/service management ID for identifying the combination of the controlling device and the service may be used for the Resource portion.

Incidentally, with the automatic connection flag being turned on in step S611, at a next connection, for example, when the controlled device 20 is temporarily powered off and then powered on again, or when the controlled device 20 disconnects a session with the XMPP server 43 and then reestablishes a session, the controlled device 20 starts processing from the transmission of the XMPP login information acquisition request <D-0-1> in step 614 after checking of the automatic connection flag in step S601. In other words, at the reconnection, the controlled device 20 skips the processing for device authentication, the acquisition of the controlled device registration password from the controlling device 10, and the processing for controlled device registration and proceeds to the processing for XMPP login. Thus, at the reconnection, the controlled device 20 can establish the connection session with the XMPP server 43 by simply performing the processing for XMPP login.

The processing for associating the controlled device 20 as an object to be controlled by the controlling device 10 serving as the controlling device is thus completed. Specific processing between two associated devices carried out when the controlling device 10 acquires content data from the controlled device 20 by direct access will be described below.

[3. Processing of Direct Access from Controlled Device]

Figure 12:
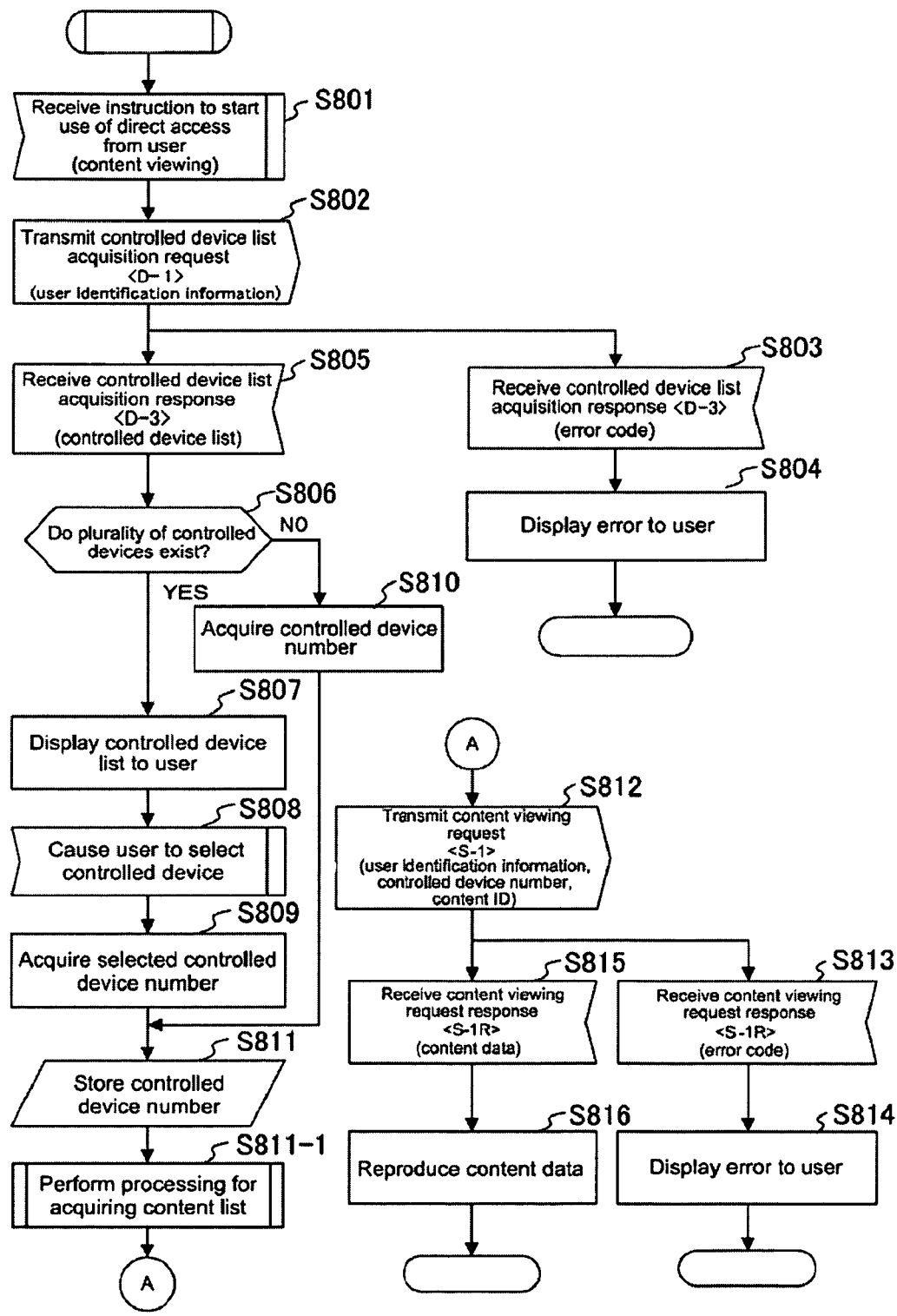
FIG. 12 is a flowchart showing the operation of the controlling device during the processing of direct access from the controlled device.
Figure 13:
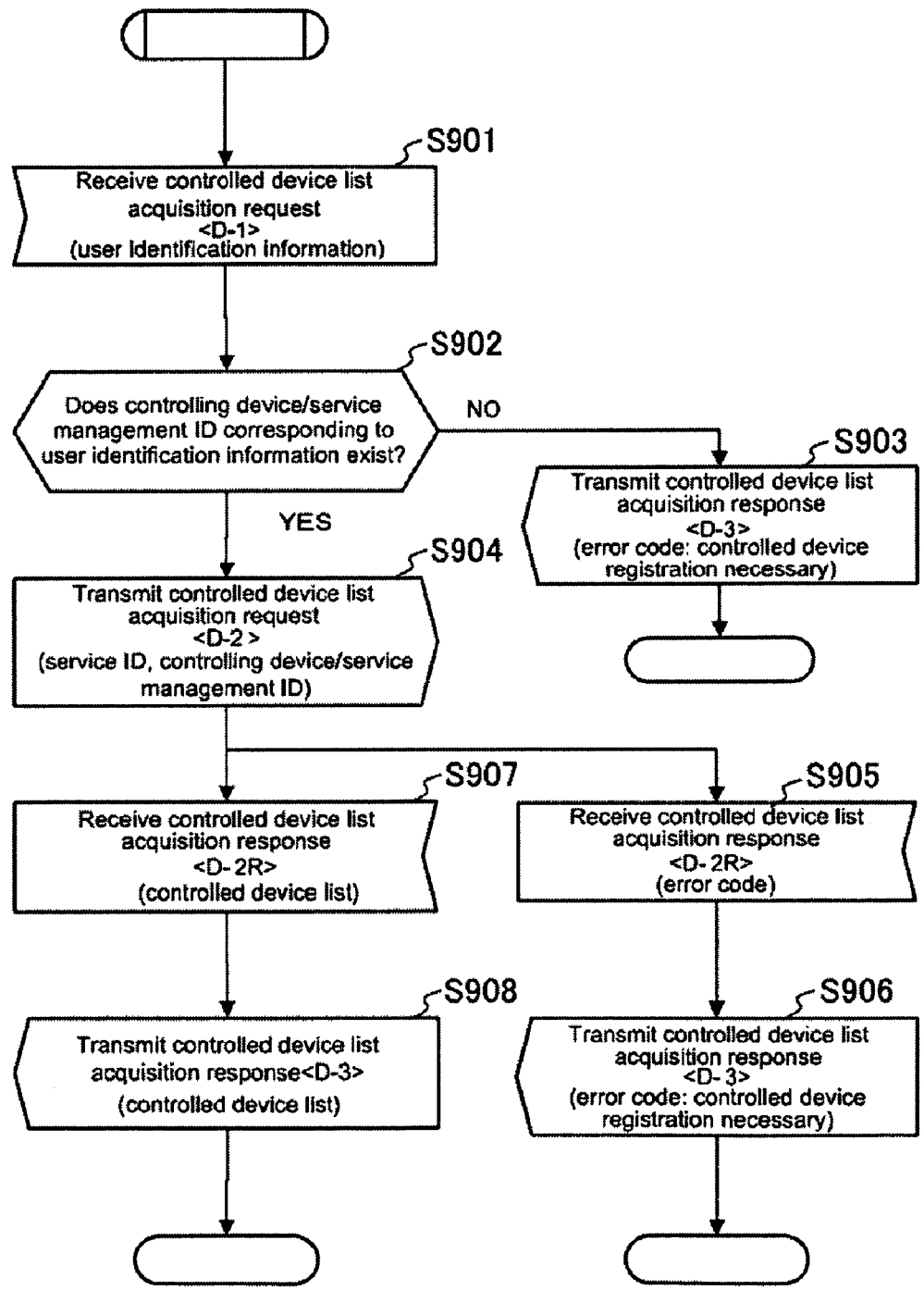
FIG. 13 is a flowchart showing the operation of the service server during the processing of direct access from the controlled device.
Figure 14:
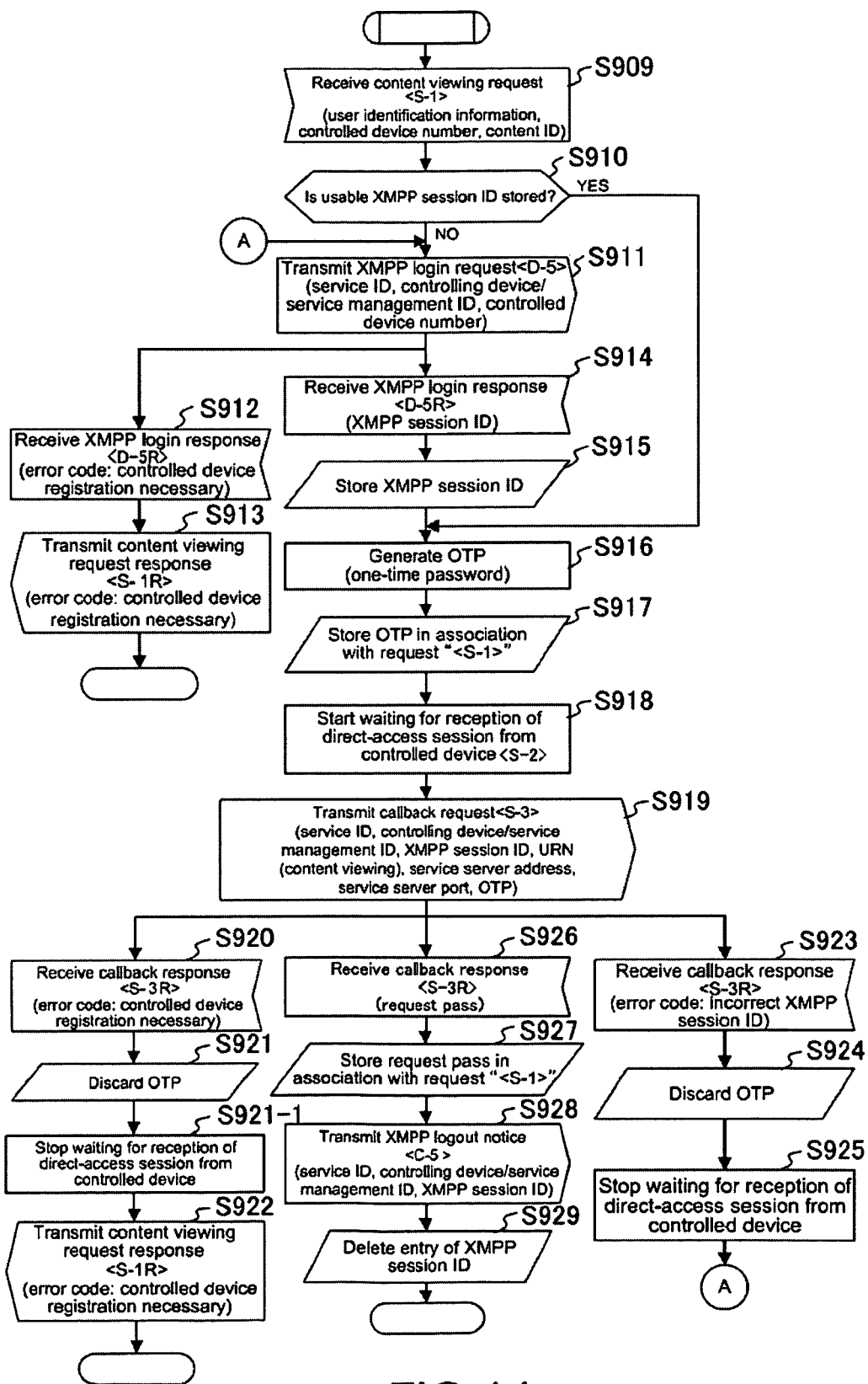
FIG. 14 is a flowchart also showing the operation of the service server during the processing of direct access from the controlled device.
Figure 15:
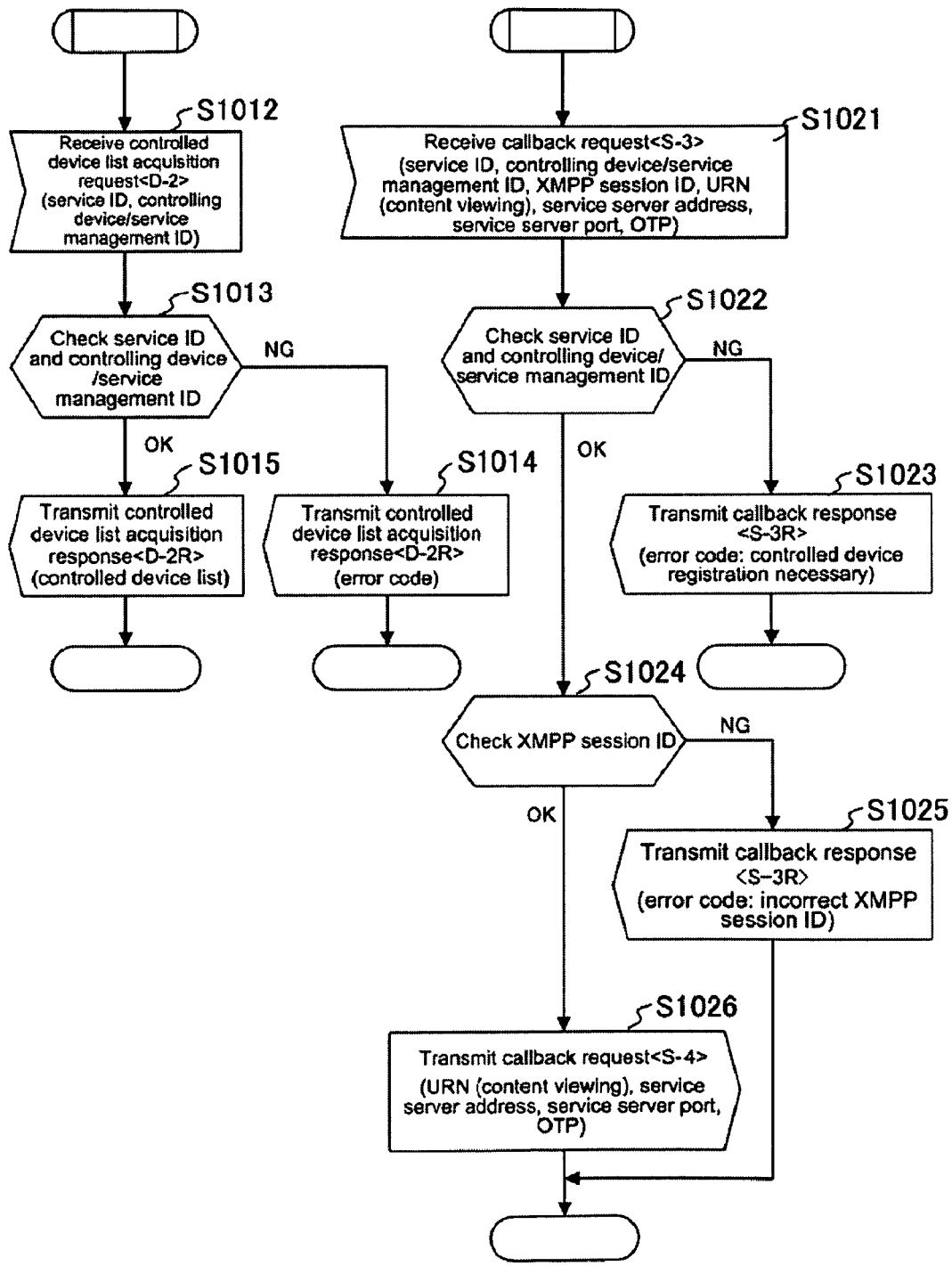
FIG. 15 is a flowchart showing the operation of the direct-access management server during the processing of direct access from the controlled device.
Figure 16:
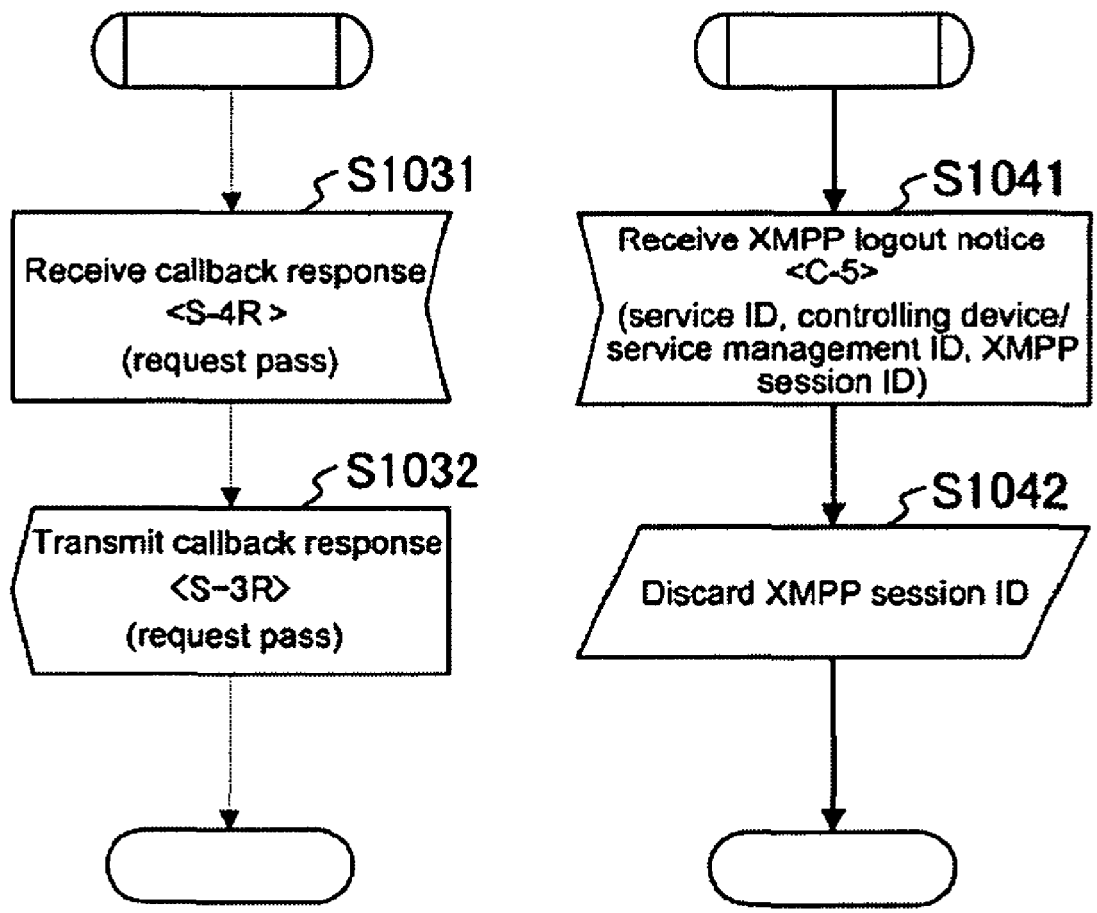
FIG. 16 is a flowchart also showing the operation of the direct-access management server during the processing of direct access from the controlled device.
Figure 17:
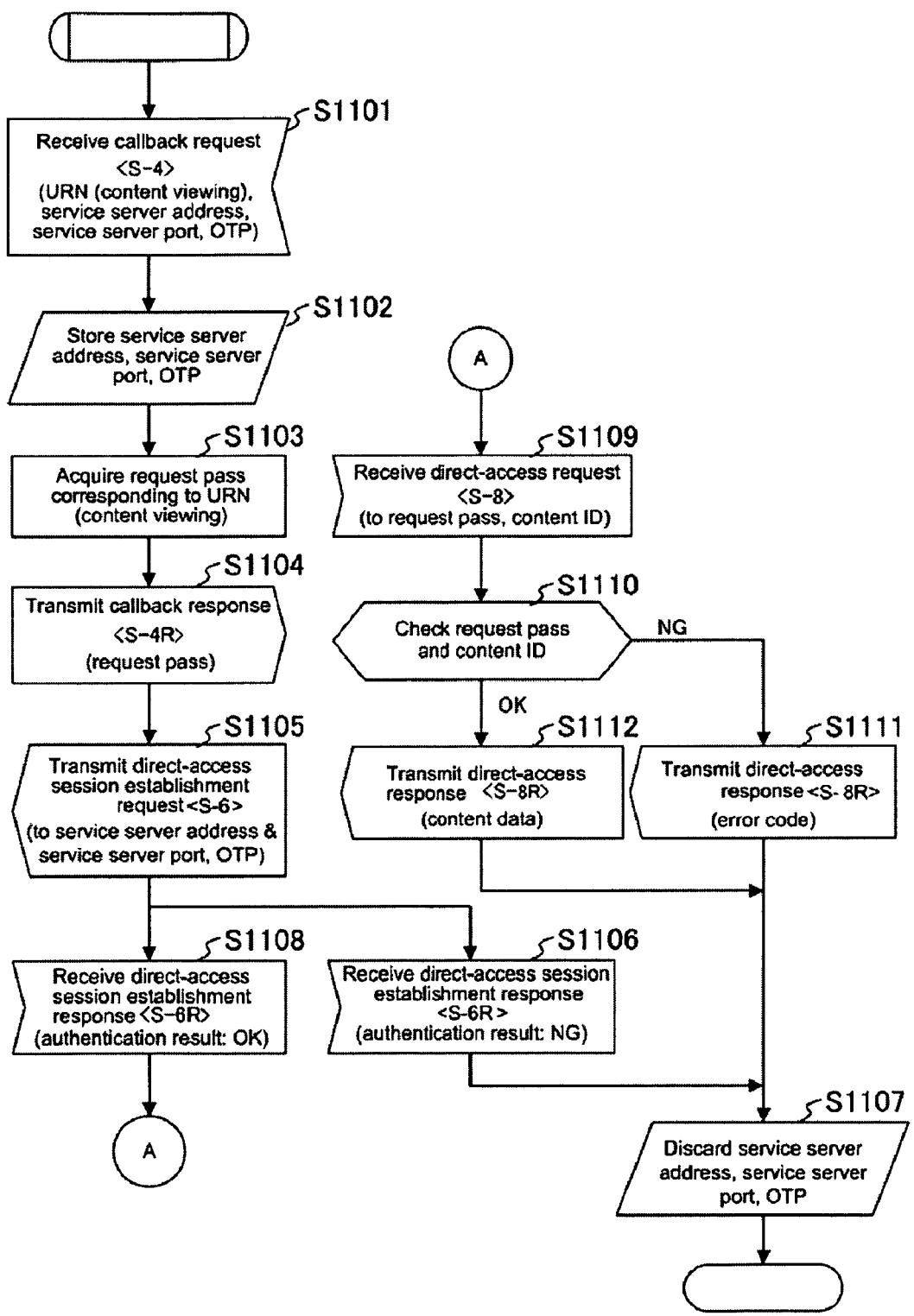
FIG. 17 is a flowchart showing the operation of the controlled device during the processing of direct access from the controlled device.
Figure 18:
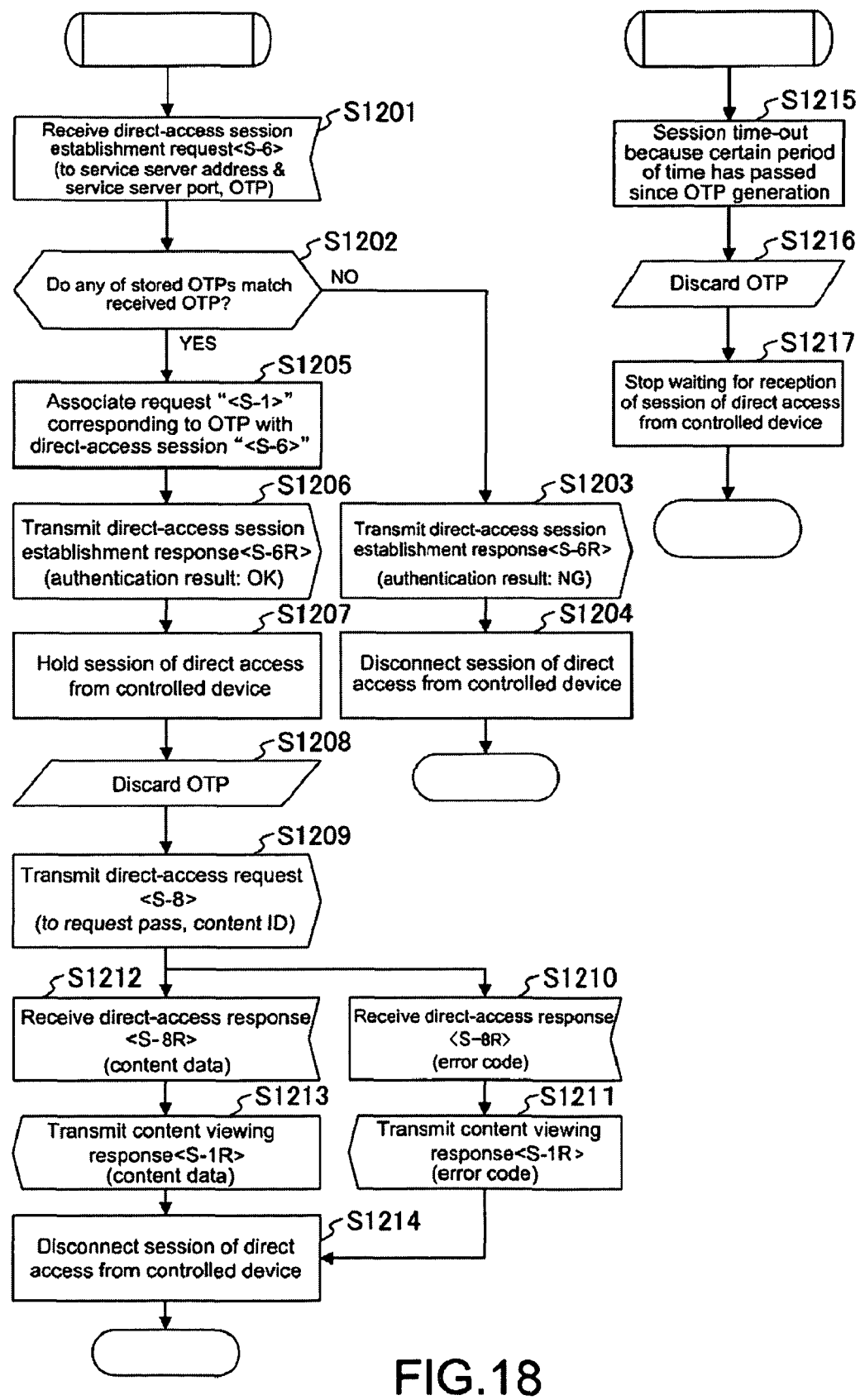
FIG. 18 is a flowchart showing the operation of the service server during the processing of direct access from the controlled device.

FIG. 4 is a sequence diagram showing processing of direct access from the controlled device 20. The direct access from the controlled device 20 refers to direct access between the service server 30 and the controlled device 20 which is started upon a direct-access session establishment request from the controlled device 20. FIG. 5 is a chart providing an outline of interface functions during the processing of direct access from the controlled device 20 in FIG. 4. FIG. 12 is a flowchart showing the operation of the controlling device 10 during the process of direct access from the controlled device 20. FIG. 13, FIG. 14, and FIG. 18 are flowcharts showing the operation of the service server 30 during the processing of direct access from the controlled device 20. FIG. 15 and FIG. 16 are flowcharts showing the operation of the direct-access management server 40 during the processing of direct access from the controlled device 20. FIG. 17 is a flowchart showing the operation of the controlled device 20 during the processing of direct access from the controlled device 20.

First, when the user of the controlling device 10 gives an instruction to start use of direct access to view a content to the controlling device 10 (step S801 in FIG. 12), the controlling device 10 transmits a controlled device list acquisition request <D-1> containing the user identification information preset in the controlling device 10 to the service server 30 (step S802 in FIG. 12).

When receiving the controlled device list acquisition request <D-1> from the controlling device 10 (step S901 in FIG. 13), the service server 30 judges whether the controlling device/service management ID corresponding to the user identification information contained in the controlled device list acquisition request <D-1> is stored in the storage unit 31 (step S902 in FIG. 13). When the controlling device/service management ID corresponding to the user identification information is not stored in the storage unit 31, the service server 30 transmits, as a controlled device list acquisition response <D-3>, an error code indicating that the registration of the controlled device is necessary to the controlling device 10 (step S903 in FIG. 13).

Meanwhile, when the controlling device/service management ID corresponding to the user identification information contained in the controlled device list acquisition request <D-1> is stored in the storage unit 31, the service server 30 transmits a controlled device list acquisition request <D-2> containing the service ID which is information for identifying the service and the controlling device/service management ID to the SOAP server 42 in the direct-access management server 40 (step S904 in FIG. 13).

When receiving the controlled device list acquisition request <D-2> from the service server 30 (step S1012 in FIG. 15), the SOAP server 42 in the direct-access management server 40 judges whether a combination of the service ID and the controlling device/service management ID contained in the controlled device list acquisition request <D-2> is stored in the storage unit 41 of the direct-access management server 40 (step S1013 in FIG. 15), and when the combination is not stored, the SOAP server 42 transmits, as a controlled device list acquisition response <D-2R>, an error code indicating that the registration of the controlled device is necessary to the service server 30 (step S1014 in FIG. 15).

When receiving, as the controlled device list acquisition response <D-2R>, the above error code from the SOAP server 42 in the direct-access management server 40 (step S905 in FIG. 13), the service server 30 transmits, as the controlled device list acquisition response <D-3>, this error code to the controlling device 10 (step S906 in FIG. 13). When receiving, as the controlled device list acquisition response <D-3>, the error code from the service server 30 (step S803 in FIG. 12), the controlling device 10 displays a message corresponding to the error code to the user via the display unit (step S804 in FIG. 12).

When in the checking in step S1013 of FIG. 15, the SOAP server 42 in the direct-access management server 40 judges that the combination of the service ID and the controlling device/service management ID contained in the controlled device list acquisition request <D-2> is stored in the storage unit 41 of the direct-access management server 40, the SOAP server 42 generates, as a controlled device list, a lest including numbers reassigned to controlled device management IDs of controlled devices controllable by the controlling device 10, device names contained in the device authentication information on the controlled devices, and so on according to the contents of linking of the controlling device/service management IDs and the controlled device management IDs stored in the storage unit 41, stores the controlled device list in the storage unit 41 in association with the controlling device/service management ID, and transmits the controlled device list acquisition response <D-2R> containing the controlled device list to the service server 30 (step S1015 in FIG. 15).

When receiving the controlled device list acquisition response <D-2R> containing the controlled device list from the SOAP server 42 in the direct-access management server 40 (step S907 in FIG. 13), the service server 30 transmits the controlled device list acquisition response <D-3> containing the controlled device list to the controlling device 10 (step S908 in FIG. 13).

When receiving the controlled device list acquisition response <D-3> containing the controlled device list (step S805 in FIG. 12), the controlling device 10 judges whether a plurality of controlled device numbers exist in the controlled device list (step S806 in FIG. 12). When a plurality of controlled device numbers exist, the controlling device 10 displays the contents of the controlled device list on the display unit (step S807 in FIG. 12), causes the user to select one from the controlled device numbers (step S808 in FIG. 12), and stores the selected controlled device number in the storage unit 11 (steps S809, S811 in FIG. 12). When a plurality of controlled devices do not exist, the controlling device 10 stores the number of the single controlled device in the storage unit 11 (steps S810, S811 in FIG. 12).

Figures 25, 26:
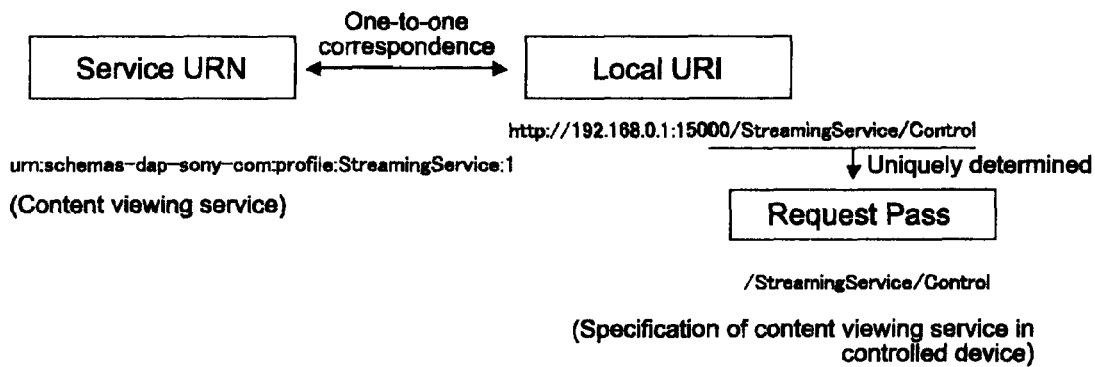
FIG. 25 is a diagram showing a specific example of the relationship among a service URN, a request pass, and a content ID.
FIG. 26 shows an example of a content list.

Then, the controlling device 10 performs the processing for acquiring a content list containing the titles, times, and content IDs of contents stored in the controlled device 20 (step S811-1) and stores the acquired content list in the storage unit 11 in association with the user identification information and the controlled device number which are stored in the storage unit 11. FIG. 26 shows an example of the content list. The specific procedure for acquiring the content list will be described later.

After causing the user to select one content ID from the content list stored in the storage unit 11, the controlling device 10 transmits a content viewing request <S-1> containing the user identification information and the controlled device number which are stored in the storage unit 11 and the content ID selected by the user to the service server 30 (step S812 in FIG. 12).

When receiving the content viewing request <S-1> from the controlling device 10 (step S909 in FIG. 14), the service server 30 checks whether an XMPP session ID usable by the service server 30 is stored in the storage unit 31 (step S910 in FIG. 14). When the XMPP session ID usable by the service server 30 is not stored, the service server 30 transmits an XMPP login request <D-5> containing the service ID, the controlling device/service management ID, and the controlled device number to the SOAP server 42 in the direct-access management server 40 in order to establish an XMPP session with the XMPP server 43 (step S911 in FIG. 14).

When receiving the XMPP login request <D-5> from the service server 30 (step S1016 in FIG. 11), the SOAP server 42 in the direct-access management server 40 judges whether a combination of the service ID, the controlling device/service management ID, and the controlled device number which are contained in the XMPP login request <D-5> is stored in the storage unit 41 (step S1017 in FIG. 11). When the combination is not stored, the SOAP server 42 in the direct-access management server 40 transmits, as an XMPP login response <D-5R>, an error code indicating that the registration of a controlled device serving as an object of the corresponding service is necessary to the service server 30 (step S1018 in FIG. 11). After that, the operation of the direct-access management server 40 is ended.

When receiving, as the XMPP login response <D-5R>, the error code indicating that the registration of the controlled device serving as the object of the corresponding service is necessary from the SOAP server 42 in the direct-access management server 40 (step S912 in FIG. 14), the service server 30 transmits the error code as a content viewing request response <S-1R> to the controlling device (step S913 in FIG. 14). When receiving the error code as the content viewing request response <S-1R> (step S813 in FIG. 12), the controlling device 10 displays an error message indicating that the registration of the controlled device 20 serving as the object of the service is necessary to the user through the display unit (step S814 in FIG. 12).

On the other hand, when the SOAP server 42 in the direct-access management server 40 judges in the judgment in step S1017 of FIG. 11 that the combination of the service ID, the controlling device/service management ID, and the controlled device number which are contained in the XMPP login request <D-5> from the service server 30 is stored in the storage unit 41, this means that the controlled device 20 serving as the object of the service is already registered, and hence, the SOAP server 42 generates the XMPP session ID usable by the service server 30, stores the XMPP session ID in the storage unit 41 in association with the service ID, the controlling device/service management ID, and the controlled device number contained in the XMPP login request <D-5> (step S1019 in FIG. 11), and transmits the XMPP login response <D-5R> containing the XMPP session ID to the service server 30 (step S1020 in FIG. 11).

When receiving the XMPP login response <D-5R> containing the XMPP session ID from the SOAP server 42 in the direct-access management server 40 (step S914 in FIG. 14), the service server 30 stores the XMPP session ID contained in the XMPP login response <D-5R> in the storage unit 31 in association with the service ID, the controlling device/service management ID, and the controlled device number (step S915 in FIG. 14).

After the XMPP session ID is stored or when it is judged in step S910 that the usable XMPP session ID is already stored in the storage unit 31, the service server 30 generates an OTP (one-time password) regarding the establishment of a direct-access session (step S916 in FIG. 14) and stores the generated OTP in the storage unit 31 in association with the content viewing request <S-1> received from the controlling device 10 (step S917 in FIG. 14). After that, the service server 30 waits for reception of the direct-access session from the controlled device 20<S-2> (step S918 in FIG. 14).

Next, the service server 30 transmits a callback request <S-3> containing the service ID, the controlling device/service management ID, the XMPP session ID, a service URN (Uniform Resource Name), a service server address, a service server port number, and the OTP to the SOAP server 42 in the direct-access management server 40 (step S919 in FIG. 14). The service URN here refers to information for designating one of services (applications) which can be provided by the controlled device 20. In this example, it refers to a content viewing service. The service server address refers to address information by which the service server 30 is uniquely identifiable on the network, that is, a global IP address. The service server port number refers to a port number necessary to access the service server 30.

When receiving the callback request <S-3> from the service server 30 (step S1021 in FIG. 15), the SOAP server 42 in the direct-access management server 40 judges whether a combination of the service ID and the controlling device/service management ID which are contained in the callback request <S-3> is stored in the storage unit 41 (step S1022 in FIG. 15), and when the combination is not stored, the SOAP server 42 transmits, as a callback response <S-3R>, an error code indicating that the registration of a controlled device serving as an object of the corresponding service is necessary to the service server 30 (step S1023 in FIG. 15).

When receiving, as the callback response <S-3R>, the error code indicating that the registration of the controlled device serving as the object of the corresponding service is necessary from the SOAP server 42 in the direct-access management server 40 (step S920 in FIG. 14), the service server 30 discards a relevant OTP from the storage unit 31 (step S921 in FIG. 14), stops waiting for reception of the direct-access session from the controlled device 20 (step S921-1 in FIG. 14), and then transmits, as the content viewing request response <S-1R>, the error code indicating that the registration of the controlled device serving as the object of the corresponding service is necessary to the controlling device 10 (step S922 in FIG. 14). The operation carried out when the controlling device 10 receives, as the content viewing request response <S-1R>, the error code indicating that the registration of the controlled device serving as the object of the corresponding service is necessary has been already described.

When the SOAP server 42 in the direct-access management server 40 judges in the judgment in step S1022 of FIG. 15 that the combination of the service ID and the controlling device/service management ID contained in the callback request <S-3> is stored in the storage unit 41, the SOAP server 42 checks the XMPP session ID contained in the callback request <S-3>. This checking is performed by judging whether a combination of the XMPP session ID, the service ID, and the controlling device/service management ID contained in the callback request <S-3> is registered in the storage unit 41 (step S1024 in FIG. 15). When the result of this checking is judged as NG, the SOAP server 42 in the direct-access management server 40 transmits, as the callback response <S-3R>, an error code indicating that an incorrect XMPP session ID is used to the service server 30 (step S1025 in FIG. 15) and ends the processing.

When receiving, as the callback response <S-3R>, the error code indicating that the incorrect XMPP session ID is used from the SOAP server 42 in the direct-access management server 40 (step S923 in FIG. 14), the service server 30 discards the relevant OTP from the storage unit 31 (step S924 in FIG. 14) and stops waiting for reception of the direct-access session from the controlled device 20 (step S925 in FIG. 14). After that, the service server 30 returns to step S911 of FIG. 14 and starts again the processing for transmitting the XMPP login request <D-5> to the XMPP server 43 in the direct-access management server 40.

When the check result of the XMPP session ID is judged as OK, the SOAP server 42 in the direct-access management server 40 extracts the service URN (content viewing), the service server address, the service server port number, and the OTP from the callback request <S-3> received from the service server 30 and transmits a callback request <S-4> containing these ones to the controlled device 20 through the always-on connection session established between the XMPP server 43 in the direct-access management server 40 and the controlled device 20 (step S1026 in FIG. 15).

When receiving the callback request <S-4> from the XMPP server 43 in the direct-access management server 40 (step S1101 in FIG. 17), the controlled device 20 stores the service URN (content viewing), the service server address, the service server port number, and the OTP which are contained in the callback request <S-4> in the storage unit 21 (step S1102 in FIG. 17). Then, the controlled device 20 acquires a request pass corresponding to the service URN (content viewing) stored in the storage unit 21 (step S1103 in FIG. 17). The request pass corresponding to the service URN here refers to, for example, information constituting part of a local URI from which the controlled device 20 accepts a request as shown in FIG. 25, and the service class (content viewing) is specified by the request pass. The service URN and the request pass are stored in the storage unit 21 of the controlled device 20 in association with each other.

Subsequently, the controlled device 20 transmits, as a callback response <S-4R>, the acquired request pass to the XMPP server 43 in the direct-access management server 40 through the always-on connection session (step S1104 in FIG. 17). When receiving the callback response <S-4R> containing the request pass from the controlled device 20 through the XMPP server 43 (step S1031 in FIG. 16), the SOAP server 42 in the direct-access management server 40 transmits the callback response <S-3R> containing the request pass to the service server 30 (step S1032 in FIG. 16).

When receiving the callback response <S-3R> containing the request pass from the SOAP server 42 in the direct-access management server 40 (step S926 in FIG. 14), the service server 30 stores the request pass contained in the callback response <S-3R> in the storage unit 31 in association with the content viewing request <S-1> (step S927 in FIG. 14). After that, the service server 30 transmits an XMPP logout notice <C-5> containing the service ID, the controlling device/service management ID, and the XMPP session ID which are used for the callback request <S-3> to the SOAP server 42 in the direct-access management server 40 (step S928 in FIG. 14), and then deletes the XMPP session ID stored in the storage unit 31 and the service ID, the controlling device/service management ID, and the controlled device number which are stored in the storage unit 31 in association with the XMPP session ID (step S929 in FIG. 14). On the other hand, when receiving the XMPP logout notice <C-5>, the SOAP server 42 in the direct-access management server 42 discards the relevant XMPP session ID stored in the storage unit 41 (step S1041 in FIG. 16, step S1042 in FIG. 16).

When the controlled device 20 can acquire the global IP address and the port number of the service server 30 and the OTP and the service server 30 can acquire the content request pass stored in the controlled device 20 as described above, the successive callback request processing is properly completed.

As described above, in this embodiment, the exchange of information between the service server 30 and the controlled device 20 for the successive callback request processing is performed through the always-on connection session established between the XMPP server 43 in the direct-access management server 40 and the controlled device 20.

Next, the operation of direct-access from the controlled device 20 will be described.

The service server 30 is assumed now to be waiting for reception of the direct-access session establishment request from the controlled device 20 (step S918 in FIG. 14). To establish the direct-access session with the service server 30, the controlled device 20 transmits a direct-access session establishment request <S-6> containing the OTP to the service server 30 on the basis of the global IP address and the port number of the service server 30 stored in the storage unit 21 in step S1102 of FIG. 17 (step S1105 in FIG. 17).

When receiving the direct-access session establishment request <S-6> containing the OTP from the controlled device 20 (step S1201 in FIG. 18), the service server 30 judges whether any of OTPs stored in the storage unit 31 matches the received OTP (step S1202 in FIG. 18). When it is judged that no OTP stored in the storage unit 31 matches the received OTP, the service server 30 transmits a direct-access session establishment response <S-6R> containing a code indicating that authentication has failed to the controlled device 20 (step S1203 in FIG. 18). After that, the service server 30 disconnects the direct-access session (step S1204 in FIG. 18).

When receiving the direct-access session establishment response <S-6R> containing the NG code indicating that the authentication is NG from the service server 30 (step 1106 in FIG. 17), the controlled device 20 discards the service server address, the service server port, and the OTP which are stored in the storage unit 21 and ends the processing (step S1107 in FIG. 17).

On the other hand, when judging in the judgment in step S1202 of FIG. 18 that one of the OTPs stored in the storage unit 31 matches the received OTP, the service server 30 associates the direct-access session establishment request <S-6> with the content viewing request <S-1> corresponding to the above OTP which has matched the received OTP (step S1205 in FIG. 18). More specifically, the user identification information, the controlled device number, and the content ID which are contained in the content viewing request <S-1> corresponding to the above OTP which has matched the received OTP are associated with the direct-access session establishment request <S-6> received from the controlled device 20. Thus, a correspondence relationship between each callback request from the service server 30 and the request for establishment of the session for direct access from the controlled device 20 can be recognized by the service server 30, so that the session for the direct access can be certainly established between proper two devices.

Next, the service server 30 transmits the direct-access session establishment response <S-6R> containing the code indicating that the authentication has succeeded to the controlled device 20 (step S1206 in FIG. 18). The direct-access session is thus established between the service server 30 and the controlled device 20 (step S1207 in FIG. 18), and the service server 30 discards the above OTP which has matched the received OTP from the storage unit 31 (step S1208 in FIG. 18). The controlled device 20 receives the direct-access session establishment response <S-6R> containing the code indicating that the authentication has succeeded from the service server 30 and waits for reception of a direct-access request from the service server 30 (step S1108 in FIG. 17). After discarding the OTP from the storage unit 31, the service server 30 transmits a direct-access request <S-8> containing the request pass acquired in step S926 of FIG. 14 and the content ID contained in the content viewing request <S-1> associated with the direct-access session establishment request <S-6> to the controlled device 20 through the established direct-access session (step S1209 in FIG. 18).

When receiving the direct-access request <S-8> from the service server 30 through the direct-access session (step S1109 in FIG. 17), the controlled device 20 checks the request pass and the content ID contained in the direct-access request <S-8> (step S1110 in FIG. 17). More specifically, the controlled device 20 checks whether the request pass contained in the direct-access request <S-8> is recorded as a value corresponding to the content viewing service in the storage unit 21 and the content ID is stored in the storage unit 21. The result of the checking is judged as OK when they are stored and judged as NG when they are not stored. When the result of checking is judged as NG, the controlled device 20 transmits a direct-access response <S-8R> containing an error code to the service server 30 through the direct-access session (step S1111 in FIG. 17), discards the global IP address and the port number of the service server 30 and the OTP which are stored in the storage unit 21, and ends the processing (step S1107 in FIG. 17).

When receiving the direct-access response <S-8R> containing the error code from the controlled device 20 through the direct-access session (step S1210 in FIG. 18), the service server 30 transmits the content viewing response <S-1R> containing the error code to the controlling device 10 (step S1211 in FIG. 18) and disconnects the direct-access session (S1214 in FIG. 18). When receiving the content viewing response <S-1R> containing the error code (step S813 in FIG. 12), the controlling device 10 displays a message corresponding to this error code to the user through the display unit (step S814 in FIG. 12).

When the result of checking in step S1110 of FIG. 17 in the controlled device 20 is judged as OK, the controlled device 20 reads relevant content data from the storage unit 21 on the basis of the request pass and the content ID which are contained in the direct-access request <S-8> from the service server 30 and transmits the content data as the direct-access response <S-8R> to the service server 30 through the direct-access session (step S1112 in FIG. 17). When receiving the direct-access response <S-8R> containing the content data from the controlled device 20 through the direct-access session (step S1212 in FIG. 18), the service server 30 transmits the received content data as the content viewing response <S-1R> to the controlling device 10 (step S1213 in FIG. 18). After transmitting the content data, the service server 30 disconnects the direct-access session (step S1214 in FIG. 18). When receiving the content data as the content viewing response <S-1R> (step S815 in FIG. 12), the controlling device 10 reproduces the content data (step S816 in FIG. 12).

It should be noted that, when the direct-access session establishment request <S-6> containing the same OTP is not received after a certain period of time has passed since the generation of the OTP in step S916 of FIG. 14, (step S1215 in FIG. 18), the service server 30 discards the OTP from the storage unit 31 (step S1216 in FIG. 18) and stops waiting for reception of the direct-access session establishment request from the controlled device 20 (step S1217 in FIG. 18).

(Method for Acquiring Content ID)

Figure 27:
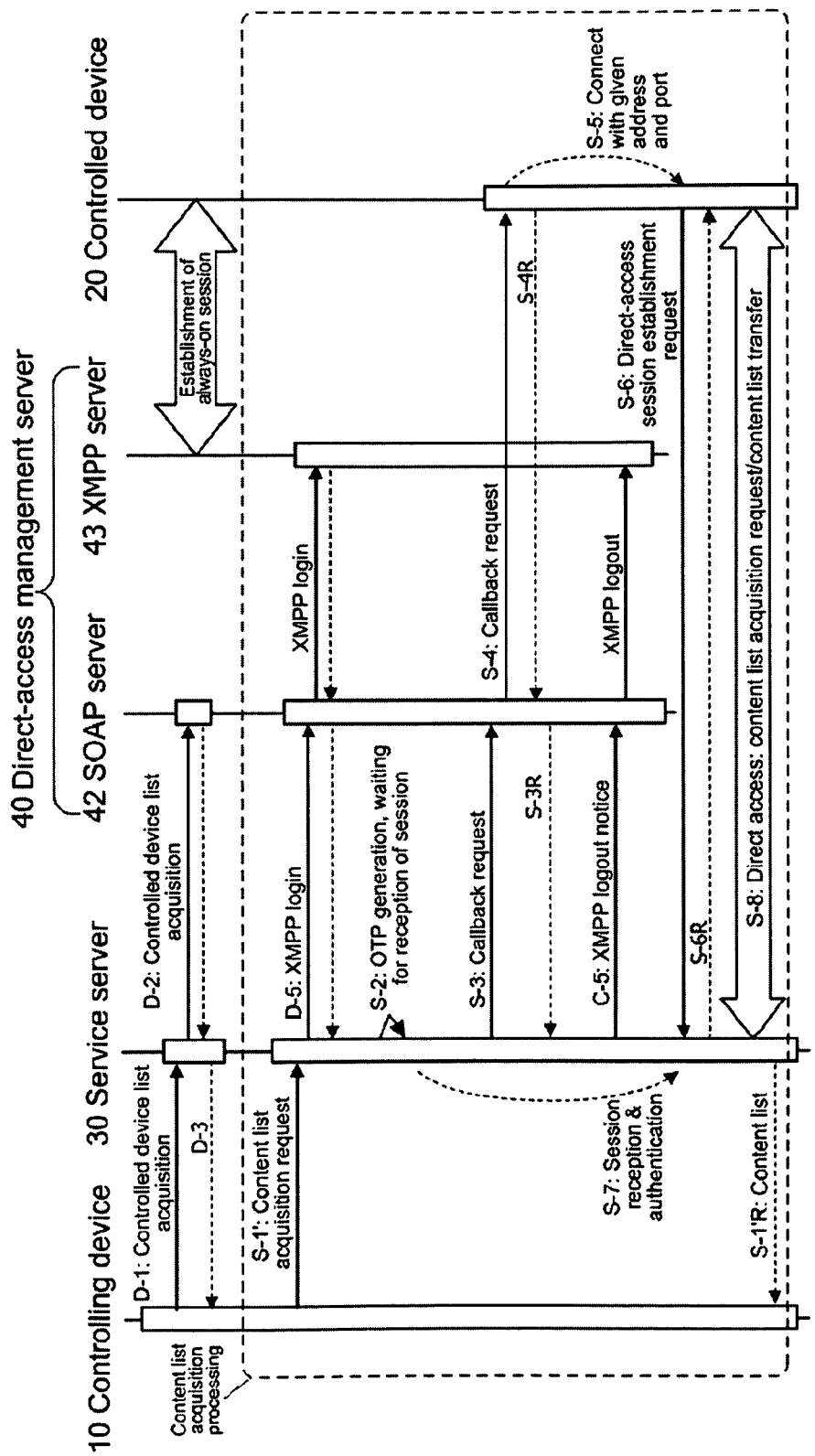
FIG. 27 is a sequence diagram of acquisition of the content list by the controlling device.

Next, an example of the above-mentioned procedure performed when the controlling device 10 acquires the content list stored in the controlled device 20 will be described. FIG. 27 is a sequence diagram of acquisition of the content list by the controlling device 10, and FIG. 28 is a chart providing an outline of interface functions during the acquisition.

As will be described later, in this example, the controlling device 10 acquires the content list stored in the controlled device 20 by the same procedure as when acquiring a content stored in the controlled device 20.

After storing the number of one controlled device selected by the user from the controlled device list acquired from the SOAP server 42 in the direct-access management server 40 through the service server 30 (step S811 in FIG. 12), the controlling device 10 transmits a content list acquisition request <S-1'> containing the user identification information stored in the storage unit 11, the controlled device number, and a retrieval condition to the service server 30. The retrieval condition here refers to a condition designated by the user in order to narrow down contents which the user wants to view.

When receiving the content list acquisition request <S-1'> from the controlling device 10, the service server 30 transmits the XMPP login request <D-5> to the SOAP server 42 in the direct-access management server 40. When receiving, as a response to the XMPP login request <D-5>, the XMPP login response <D-5R> containing the XMPP session ID, the service server 30 generates the OTP regarding the establishment of the direct-access session and waits for reception of the direct-access session from the controlled device 20<S-2>. Since the operation carried out from the transmission of the XMPP login request <D-5> from the service server 30 to the SOAP server 42 in the direct-access management server 40 to <S-2> in which the service server 30 comes to wait for reception of the direct-access session from the controlled device 20 is the same as in the case of the content viewing request, a description thereof is omitted.

After that, the service server 30 transmits the callback request <S-3> containing the service ID, the controlling device/service management ID, the XMPP session ID, the service URN (content list acquisition), the service server address, the service server port number, and the OTP to the SOAP server 42 in the direct-access management server 40.

As in the case of the content viewing request, the SOAP server 42 in the direct-access management server 40 which has received the callback request <S-3> successively performs checking of a combination of the service ID and the controlling device/service management ID and checking of the XMPP session ID. When the results of checking are both OK, the SOAP server 42 extracts the service URN (content list acquisition), the service server address, the service server port number, and the OTP from the callback request <S-3> received from the service server 30 and transmits the callback request <S -4> containing these ones to the controlled device 20 through the always-on connection session established between the XMPP server 43 in the direct-access management server 40 and the controlled device 20. Incidentally, since the operation carried out when the results of checking are judged as NG is the same as in the case of the content viewing request, a description thereof is omitted.

When receiving the callback request <S-4> from the XMPP server 43 in the direct-access management server 40, the controlled device 20 stores the service URN (content list acquisition), the service server address, the service server port number, and the OTP which are contained in the callback request <S-4> in the storage unit 21 and acquires a request pass corresponding to the service URN (content list acquisition).

The operation carried out from the processing in which the controlled device 20 transmits the acquired request pass as the callback response <S-4R> to the XMPP server 43 in the direct-access management server 40 through the always-on connection session to the processing in which the service server 30 establishes the direct-access session with the controlled device 20 upon receiving the direct-access session establishment request <S-6> from the controlled device 20 and transmits the direct-access session establishment response <S-6R> is the same as in the case of the content viewing request.

After that, the service server 30 transmits the direct-access request <S-8> containing the acquired request pass and the retrieval condition contained in the content list acquisition request <S-1'> associated with the direct-access session establishment request <S-6> to the controlled device 20 through the established direct-access session.

When receiving the direct-access request <S-8> from the service server 30 through the direct-access session, the controlled device 20 reads a relevant content list from the storage unit 21 on the basis of the request pass and the retrieval condition contained in the direct-access request <S-8> and transmits the content list as the direct-access response <S-8R> to the service server 30 through the direct-access session.

When receiving the direct-access response <S-8R> containing the content list from the controlled device 20 through the direct-access session, the service server 30 transmits the received content list as a content list acquisition response (S-1'R) to the controlling device 10. After transmitting the content list, the service server 30 disconnects the direct-access session. Thus, the controlling device 10 acquires the content list and then, as described above, stores the acquired content list in the storage unit 11 in association with the user identification information and the controlled device number and proceeds to the processing for transmitting the content viewing request <S-1>.

As described above, according to a network system 100 of this embodiment, the controlled device 20 is notified of a global IP address and a port number of the service server 30 to which the global IP address is assigned, and connects with the service server 30 on the basis of the global IP address and the port number to request the establishment of a session for direct access, so that the direct-access session can be established between the service server 30 and the controlled device 20 regardless of the presence or absence of an environment where a global IP address can be assigned to the controlled device 20. In consequence, the situation in which large-volume data needs to be transferred in a tunneling mode between the service server 30 and the controlled device 20 via the direct-access management server 40 is eliminated, so that the load on the direct-access management server 40 can be reduced. Moreover, according to the network system 100 of this embodiment, it is unnecessary to assign the global IP address to the controlled device 20, port forward setting of the router 50 becomes unnecessary.

Second Embodiment

Next, a second embodiment of the present invention will be described.

In the first embodiment, the direct-access session between the service server 30 and the controlled device 20 is established, but in the second embodiment, a case is assumed where a direct-access session between the controlling device 10 and the controlled device 20 is established. Moreover, in the second embodiment, an environment is assumed where the assignment of a global IP address to the controlling device 10 is not ensured. In this embodiment, the controlling device 10 corresponds to the first device and the controlled device 20 corresponds to the second device.

Figure 19:
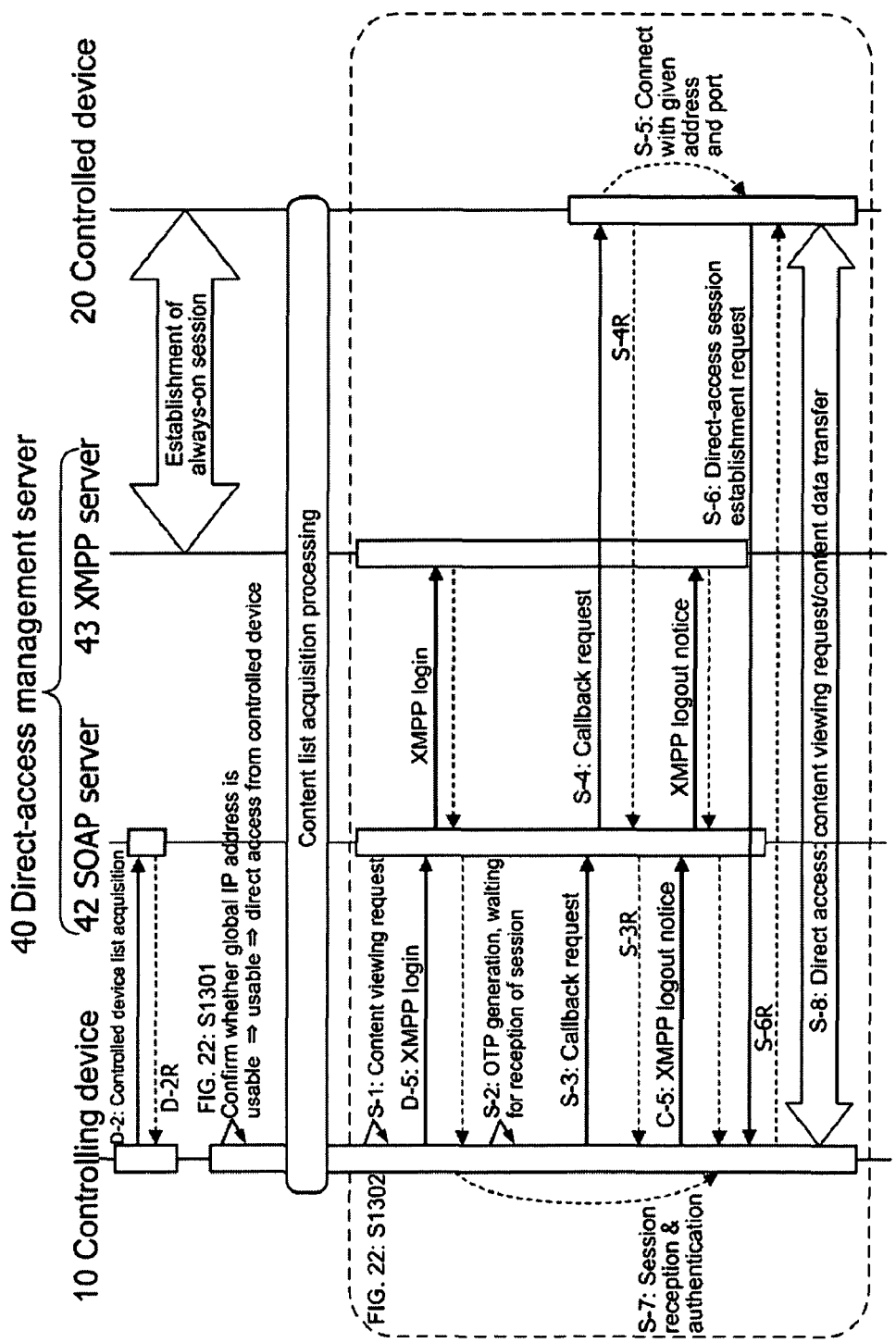
FIG. 19 is a sequence diagram regarding processing of direct access from the controlled device in the network system of a second embodiment of the present invention.
Figure 20:
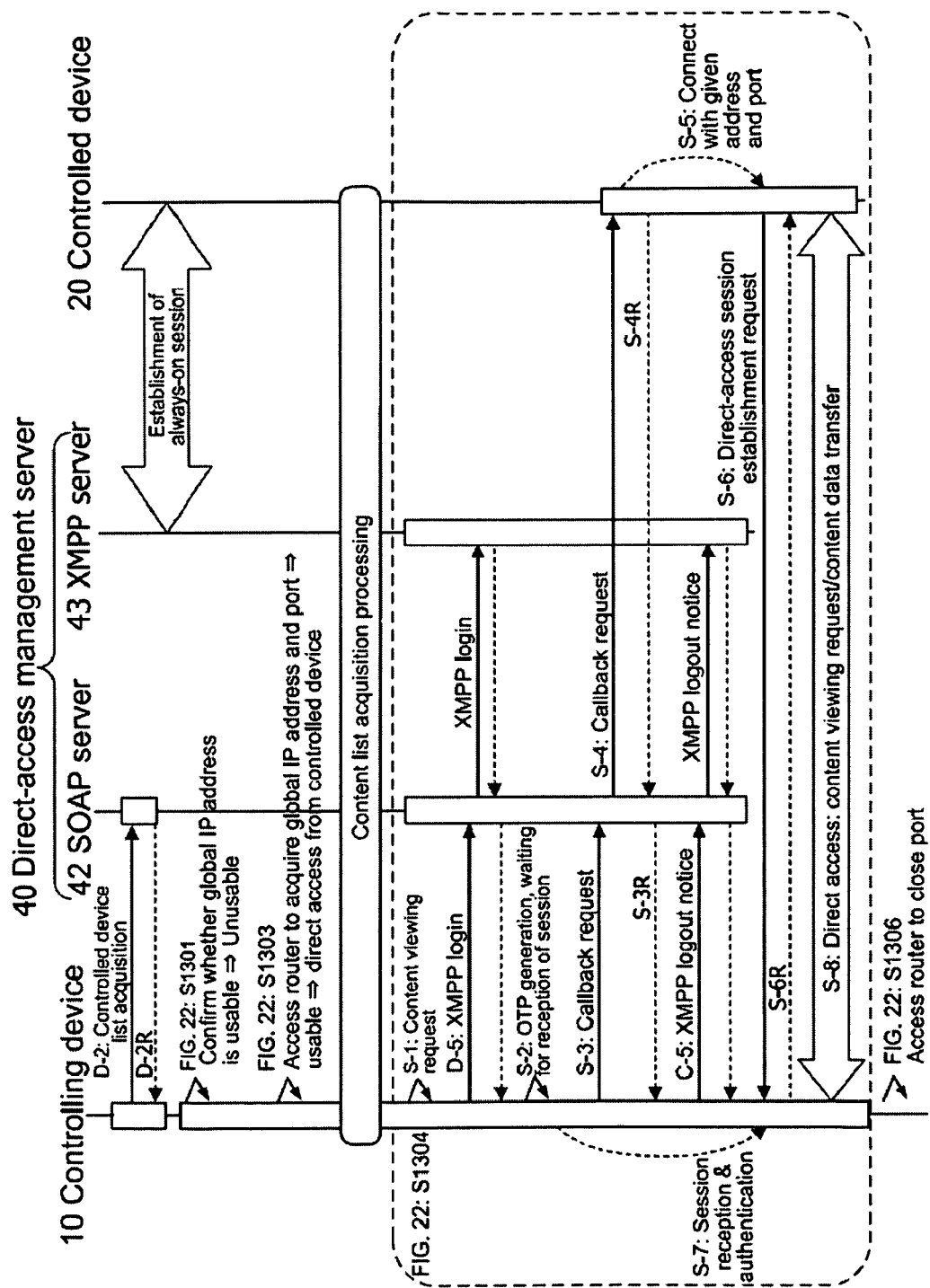
FIG. 20 is another sequence diagram regarding the processing of direct access from the controlled device in the network system of the second embodiment of the present invention.
Figure 21:
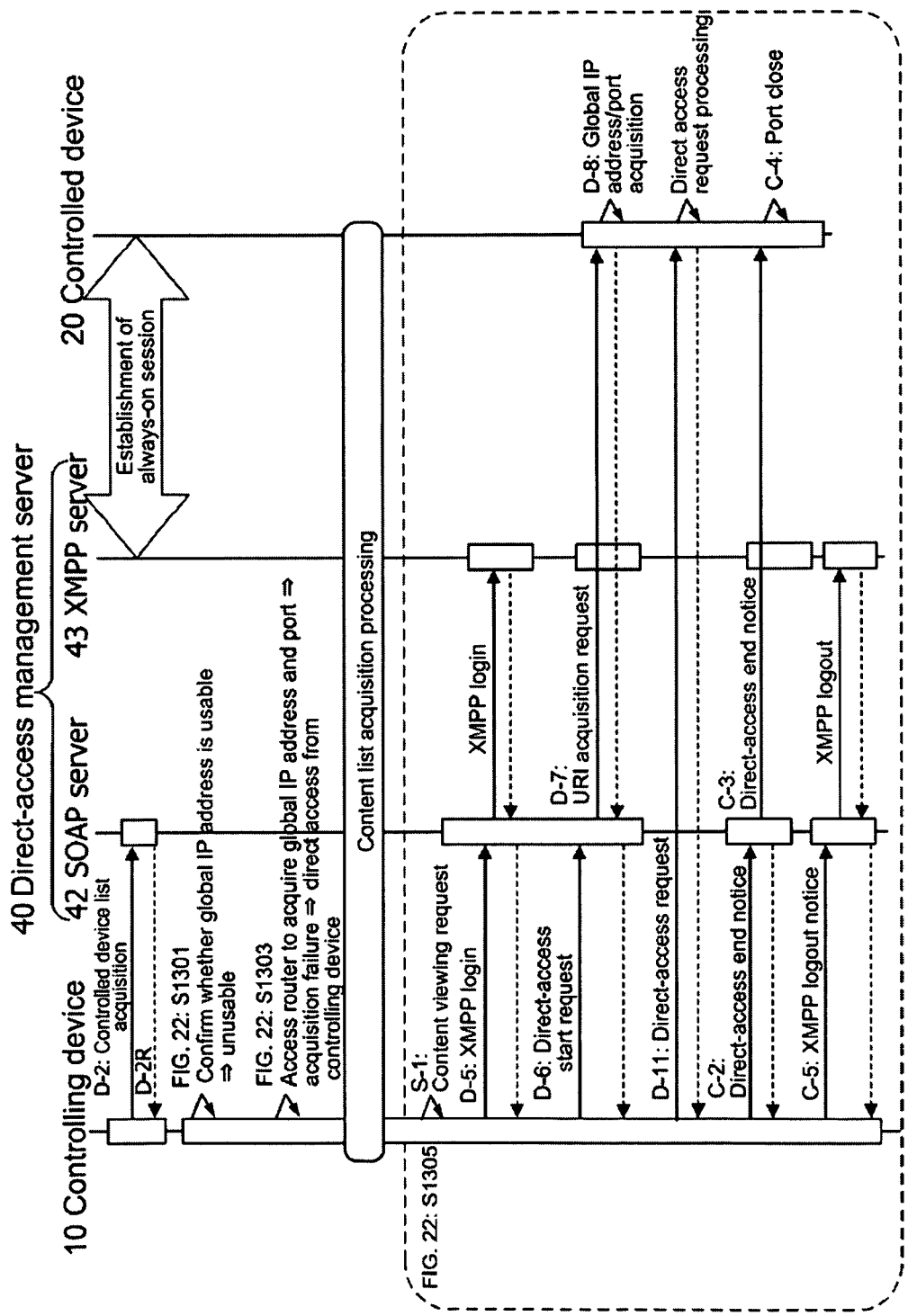
FIG. 21 is a sequence diagram regarding the processing of direct access from the controlling device in the network system of the second embodiment of the present invention.

FIG. 19 to FIG. 21 are sequence diagrams of three patterns of possible direct access processing in a network system of the second embodiment.

First, in FIG. 19 to FIG. 21, when the user of the controlling device 10 gives the controlling device 10 an instruction to start the use of direct access for viewing a content, the controlling device 10 transmits the controlled device list acquisition request <D-2> containing the user identification information preset in the controlling device 10 and the service ID being information for identifying the service and the controlling device/service management ID which have been previously acquired from the service server 30 to the SOAP server 42 in the direct-access management server 40.

When receiving the controlled device list acquisition request <D-2> from the controlling device 10, the SOAP server 42 in the direct-access management server 40 judges whether a combination of the service ID and the controlling device/service management ID contained in the controlled device list acquisition request <D-2> is stored in the storage unit 41 of the direct-access management server 40, and generates, as a controlled device list, a list including numbers reassigned to controlled device management IDs of controlled devices controllable by the controlling device 10, device names contained in the device authentication information of the controlled devices, and so on according to the contents of linking of the controlling device/service management IDs and the controlled device management IDs stored in the storage unit 41, stores the controlled device list in the storage unit 41 in association with the controlling device/service management ID, and transmits the controlled device list acquisition response <D-2R> containing the controlled device list to the controlling device 10.

When receiving the controlled device list acquisition response <D-2R> containing the controlled device list, the controlling device 10 performs processing for judging enabled direct access processing in the following manner.

Figure 22:
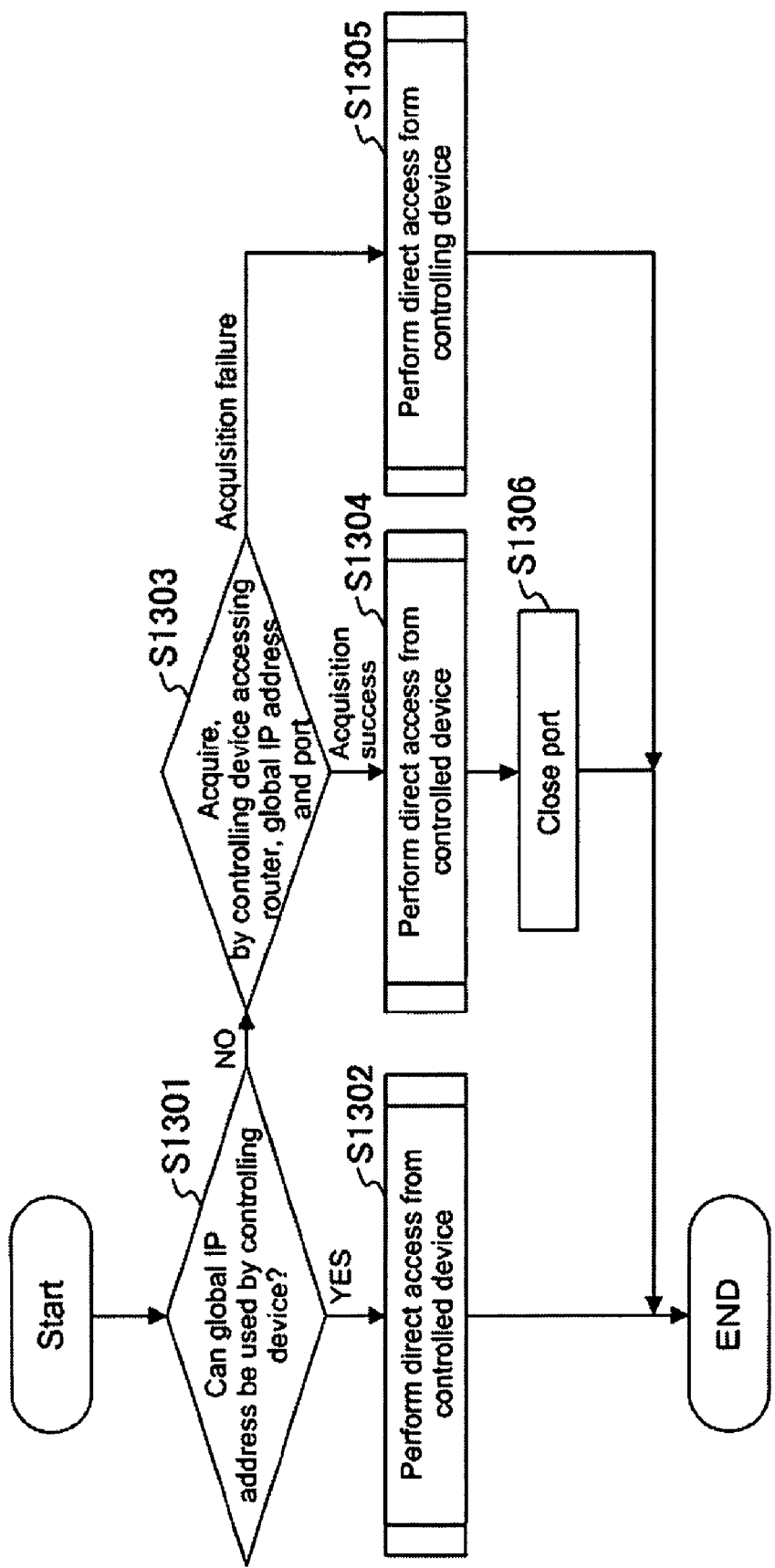
FIG. 22 is a flowchart of the controlled device in the registration.

FIG. 22 is a flowchart showing the procedure of the processing for judging the enabled direct access processing. First, it is judged whether the controlling device 10 can use the global IP address (step S1301 in FIG. 22). If the controlling device 10 can use the global IP address, the controlling device 10 judges that the processing of direct access from the controlled device 20 is enabled (step S1302 in FIG. 22). More specifically, for example, when the controlling device 10 is directly connected to an external network, the controlling device 10 can use the global IP address, and in this case, it is judged that the processing of direct access from the controlled device 20 is enabled. When the controlling device 10 is not allowed to use the global IP address, the controlling device 10 then accesses a router (not shown) which connects the controlling device 10 to the external network and tries acquisition of a global IP address and a port number (step S1303 in FIG. 22). In an environment where the controlling device 10 is connected to the external network via the router, the controlling device 10 can acquire the global IP address and the port number and judges that the processing of direct access from the controlled device 20 is enabled (step S1304 in FIG. 22). When the router does not exist or when the acquisition of the global IP address and the port number from the router has failed, the controlling device 10 judges that the processing of direct access from the controlling device 10 is enabled (step S1305 in FIG. 22).

FIG. 19 is a sequence diagram regarding the processing of direct access from the controlled device 20 in step S1302 when it is judged in step S1301 of FIG. 22 that the controlling device 10 can use the global IP address.

The controlling device 10 performs the processing for acquiring the content list containing the titles, times, and content IDs of contents stored in the controlled device 20 and stores the acquired content list in the storage unit 11 in association with the user identification information and the controlled device number.

When, after the controlling device 10 causes the user to select one content ID from the content list stored in the storage unit 11, the content viewing request containing the user identification information and the controlled device number which are stored in the storage unit 11 and the content ID selected by the user is inputted by the user, the controlling device 10 checks whether an XMPP session ID usable by the controlling device 10 is stored in the storage unit 11, and when it is not stored, this means that the XMPP session has not been established yet between the controlling device 10 and the XMPP server 43, and therefore the controlling device 10 transmits the XMPP login request <D-5> containing the service ID, the controlling device/service management ID, and the controlled device number to the SOAP server 42 in the direct-access management server 40 in order to establish the XMPP session with the XMPP server 43.

When receiving the XMPP login request <D-5> from the controlling device 10, the SOAP server 42 in the direct-access management server 40 judges whether a combination of the service ID, the controlling device/service management ID, and the controlled device number contained in the XMPP login request <D-5> is stored in the storage unit 41, and when the combination is stored, this means that the controlled device 20 serving as the object of the service is already registered, and hence, the SOAP server 42 generates the XMPP session ID usable by the controlling device 10, stores the XMPP session ID in the storage unit 41 in association with the service ID, the controlling device/service management ID, and the controlled device number which are contained in the XMPP login request <D-5>, and transmits the XMPP login response <D-5R> containing the XMPP session ID to the controlling device 10.

When receiving the XMPP login response <D-5R> containing the XMPP session ID from the SOAP server 42 in the direct-access management server 40, the controlling device 10 stores the XMPP session ID contained in the XMPP login response <D-5R> in the storage unit 11 in association with the service ID, the controlling device/service management ID, and the controlled device number. After the XMPP session ID is stored or when the usable XMPP session ID is already stored in the storage unit 11, the controlling device 10 generates an OTP (one-time password) regarding the establishment of a direct-access session and stores the generated OTP in the storage unit 11 in association with the content viewing request <S-1>. After that, the controlling device 10 waits for reception of the direct-access session from the controlled device 20<S-2>.

Next, the controlling device 10 transmits the callback request <S-3> containing the service ID, the controlling device/service management ID, the XMPP session ID, the service URN (content viewing), the global IP address and the port number of the controlling device 10, and the OTP to the SOAP server 42 in the direct-access management server 40.

When receiving the callback request <S-3> from the controlling device 10, the SOAP server 42 in the direct-access management server 40 judges whether a combination of the service ID and the controlling device/service management ID which are contained in the callback request <S-3> is stored in the storage unit 41, and when judging that the combination is stored, the SOAP server 42 checks the XMPP session ID contained in the callback request <S-3 >. This checking is performed by judging whether a combination of the XMPP session ID, the service ID, and the controlling device/service management ID which are contained in the callback request <S-3> is registered in the storage unit 41. The result of this checking is judged as OK, the SOAP server 42 in the direct-access management server 42 extracts the service URN (content viewing), the global IP address and the port number of the controlling device 10, and the OTP from the callback request <S-3> received from the controlling device 10, and transmits the callback request <S-4> containing these ones to the controlled device 20 through the always-on connection session established between the XMPP server 43 in the direct-access management server 40 and the controlled device 20.

When receiving the callback request <S-4> from the XMPP server 43 in the direct-access management server 40, the controlled device 20 stores the service URN (content viewing), the global IP address and the port number of the controlling device 10, and the OTP contained in the callback request <S-4> in the storage unit 21. Then, the controlled device 20 acquires a request pass corresponding to the service URN (content viewing) stored in the storage unit 21.

Subsequently, the controlled device 20 transmits the acquired request pass as the callback response <S-4R> to the XMPP server 43 in the direct-access management server 40 through the always-on connection session. When receiving the callback response <S-4R> containing the request pass from the controlled device 20 through the XMPP server 43, the SOAP server 42 in the direct-access management server 40 transmits the callback response (S -3R> containing the request pass to the controlling device 10.

When receiving the callback response <S-3R> containing the request pass from the SOAP server 42 in the direct-access management server 40, the controlling device 10 stores the request pass contained in the callback response <S-3R> in the storage unit 11 in association with the content viewing request <S-1>. After that, the controlling device 10 transmits the XMPP logout notice <C-5> containing the service ID, the controlling device/service management ID, and the XMPP session ID which are used for the callback request <S-3> to the SOAP server 42 in the direct-access management server 40, and then deletes the XMPP session ID stored in the storage unit 11 and the service ID, the controlling device/service management ID, and the controlled device number which are stored in the storage unit 11 in association with the XMPP session ID. On the other hand, when receiving the XMPP logout notice <C-5>, the SOAP server 42 in the direct-access management server 42 discards the relevant XMPP session ID stored in the storage unit 41.

Next, the operation of direct access from the controlled device 20 will be described.

The service server 30 is in a state of waiting for reception of the direct-access session establishment request from the controlled device 20. As described above, after transmitting the request pass as the callback response <S-4R> to the SOAP server 42 in the direct-access management server 40 through the always-on connection session, to establish the direct-access session with the controlling device 10, the controlled device 20 transmits the direct-access session establishment request <S-6> containing the OTP to the controlling device 10 on the basis of the global IP address and the port number of the controlling device 10 stored in the storage unit 21.

When receiving the direct-access session establishment request <S-6> containing the OTP from the controlled device 20, the controlling device 10 judges whether any of OTPs stored in the storage unit 11 matches the received OTP. When judging that there is an OTP that matches the received OTP, the controlling device 10 associates the direct-access session establishment request <S-6> with the content viewing request <S-1> corresponding to the above OTP which has matched the received OTP. In other words, the user identification information, the controlled device number, and the content ID which are contained in the content viewing request <S-1> corresponding to the above OTP which has matched the received OTP is associated with the direct-access session establishment request <S-6> received from the controlled device 20.

Next, the controlling device 10 transmits the direct-access session establishment response <S-6R> containing the code indicating that authentication has succeeded to the controlled device 20. The direct-access session is thus established between the controlling device 10 and the controlled device 20, and the controlling device 10 discards the above OTP which has matched the received OTP from the storage unit 11. The controlled device 20 then receives the direct-access session establishment response <S-6R> containing the code indicating that the authentication has succeeded from the controlling device 10 and waits for reception of the direct-access request from the controlling device 10.

After discarding the OTP from the storage unit 11, the controlling device 10 transmits the direct-access request <S-8> containing the request pass and the content ID contained in the content viewing request <S-1> associated with the direct-access session establishment request <S-6> to the controlled device 20 through the established direct-access session.

When receiving the direct-access request <S-8> from the controlling device 10 through the direct-access session, the controlled device 20 checks the request pass and the content ID contained in the direct-access request <S-8>. More specifically, the controlled device 20 checks whether a combination of the request pass and the content ID contained in the direct-access request (S-8> is stored in the storage unit 21. The result of the checking is judged as OK when the combination is stored and judged as NG when it is not stored. When the result of checking is judged as OK, the controlled device 20 reads relevant content data from the storage unit 21 on the basis of the request pass and the content ID contained in the direct-access request <S-8> from the controlling device 10 and transmits this content data as the direct-access response <S-8R> to the controlling device 10 through the direct-access session. When receiving the direct-access response <S-8R> containing the content data from the controlled device 20 through the direct-access session, the controlling device 10 reproduces the content data and, after the reception of the content data ends, disconnects the direct-access session.

FIG. 20 is a sequence diagram including the direct access from the controlled device 20 in step S1304 when it is judged in step S1301 of FIG. 22 that the controlling device 10 is not allowed to use the global IP address and the controlling device 10 could acquire the global IP address and the port number from the router in step S1303 of FIG. 22.

In this case, the operation regarding the processing of direct access from the controlled device 20 is basically the same as that of FIG. 19, but different therefrom in the following point. When the controlling device 10 transmits the callback request <S-3> to the SOAP server 42 in the direct-access management server 40, the controlling device 10 transmits the callback request <S-3> containing the global IP address and the port number of the controlling device 10 acquired from the router in addition to the service ID, the controlling device/service management ID, the XMPP session ID, and the service URN (content viewing). Moreover, after the direct access from the controlled device 20 in step S1304 ends, the processing in which the controlling device 10 accesses the router and causes the router to close the port (step S1306 in FIG. 22) is necessary.

FIG. 21 is a sequence diagram regarding the processing of the direct access from the controlling device 10 in step S1305 when it is judged in step S1301 of FIG. 22 that the controlling device 10 is not allowed to use the global IP address and the controlling device 10 could not acquire the global IP address and the port number from the router in step S1303 of FIG. 22.

It should be noted that in this sequence diagram, the direct access from the controlling device 10 when the controlled device 20 could acquire the global IP address and the port number from the router 50 is assumed.

When the content viewing request <S-1> containing the user identification information and the controlled device number is produced in the controlling device 10, the controlling device 10 checks whether the XMPP session ID usable by the controlling device 10 is stored in the storage unit 11, and when it is not stored, this means that the XMPP session has not been established yet between the controlling device 10 and the XMPP server 43, and therefore the controlling device 10 transmits the XMPP login request <D-5> containing the service ID, the controlling device/service management ID, and the controlled device number to the SOAP server 42 in the direct-access management server 40 in order to establish the XMPP session with the XMPP server 43.

When receiving the XMPP login request <D-5> from the controlling device 10, the SOAP server 42 in the direct-access management server 40 judges whether a combination of the service ID, the controlling device/service management ID, and the controlled device number contained in the XMPP login request <D-5> is stored in the storage unit 41, and when the combination is stored, this means that the controlled device 20 serving as the object of the service is already registered, and hence, the SOAP server 42 generates the XMPP session ID usable by the controlling device 10, stores the XMPP session ID in the storage unit 41 in association with the service ID, the controlling device/service management ID, and the controlled device number which are contained in the XMPP login request <D-5>, and transmits the XMPP login response <D-5R> containing the XMPP session ID to the controlling device 10.

When receiving the XMPP login response <D-5R> containing the XMPP session ID from the SOAP server 42 in the direct-access management server 40, the controlling device 10 stores the XMPP session ID contained in the XMPP login response <D-5R> in the storage unit 11 in association with the service ID, the controlling device/service management ID, and the controlled device number. After the XMPP session ID is stored or when the usable XMPP session ID is already stored in the storage unit 11, the controlling device 10 generates a direct-access start request <D-6> containing the service ID, the controlling/service management ID, the service URN (content viewing), and the XMPP session ID to the SOAP server 42 in the direct-access management server 40 in order to establish the session for direct access with the controlled device 20.

When receiving the direct-access start request <D-6> from the controlling device 10, the SOAP server 42 in the direct-access management server 40 transmits a direct-access URI acquisition request <D-7> to the controlled device 20 through the always-on connection session established between the XMPP server 43 in the direct-access management server 40 and the controlled device 20.

The controlled device 20 assigns a direct access local port according to the direct access URI acquisition request <D-7> from the XMPP server 43 in the direct-access management server 40, transmits a direct-access port NAT (Network Address Translation) setting request containing a local IP preassigned to the controlled device 20 and a port number of the direct-access local port to the router 50, and requests the router 50 to map a global IP address and a port number, which are accessible from the Internet, to the local IP address and the port number.

The controlled device 20 receives, as a NAT setting response, the global IP address and the port number associated with the local IP address and the port number of the controlled device 20 from the router 50, creates a direct-access URI list by using these global IP address and port number, and transmits the direct-access URI to the XMPP server 43 in the direct-access management server 40. The direct-access URI refers to a URI for direct access from the controlling device 10 to the controlled device 20 through the network. When receiving the direct access URI through the XMPP server 43, the SOAP server 42 in the direct-access management server 40 transmits it as a direct access start response to the controlling device 10.

When acquiring the direct access URI received from the SOAP server 42 in the direct-access management server 40, the controlling device 10 accesses the received direct access URI and transmits, as a direct-access request <D-11>, the content viewing request containing the content ID to the controlled device 20.

When receiving the content viewing request containing the content ID as the direct-access request <D-11> from the controlling device 10, the controlled device 20 checks whether the direct-access URI and the content ID are right, and when they are right, transmits content data specified by the content ID to the controlling device 10.

When receiving the content data from the controlled device 20, the controlling device 10 reproduces the content data, and after the reception of the content data ends, transmits a direct-access end notice <C-2> containing the service ID, the controlling device/service management ID, the XMPP session ID, the service URN (content viewing), the direct-access URI to the SOAP server 42 in the direct-access management server 40. When receiving the direct-access end notice <C-2>, the direct-access management server 40 transmits a direct-access end notice <C-3> containing the service URN (content viewing) and the direct access URI to the controlled device 20. When receiving the direct-access end notice <C-3>, the controlled device 20 closes a direct-access port containing the global IP address and the port number regarding the designated direct-access URI <C-4>.

After transmitting the direct-access end notice <C -2>, the controlling device 10 transmits the XMPP logout notice <C-5> containing the service ID, the controlling device/service management ID, and the XMPP session ID to the SOAP server 42 in the direct-access management server 40. Finally, the controlling device 10 deletes the entry of the XMPP session ID.

When receiving the XMPP logout notice <C-5> containing the service ID, the controlling device/service management ID, and the XMPP session ID, the SOAP server 42 in the direct-access management server 40 discards the relevant XMPP session ID stored in the storage unit 41.

It should be noted that in each of three patterns of the direct access processing shown in FIG. 19 to FIG. 21, the processing for acquiring the content list before the content viewing request is performed in the same procedure as in the case of the content viewing request of the corresponding pattern. The case of the content list acquisition request mainly differs from the case of the content viewing request in that in place of the content ID, the retrieval condition is designated by the user, in place of the content viewing service URN, the content list acquisition service URN is designated as the service URN, and that the controlled device 20 reads the relevant content list from the storage unit 21 on the basis of the retrieval condition contained in the received content list acquisition request (direct-access request) and transmits the content list as the direct-access response.

As described above, in the second embodiment, when the global IP address and the port number of the controlling device 10 can be specified, by transmitting the callback request containing these global IP address and port number of the controlling device 10 from the controlling device 10 to the controlled device 20 through the always-on connection session provided by the direct-access management server 40, the controlled device 20 connects with the controlling device 10 on the basis of the global IP address and the port number of the controlling device 10 to request the establishment of the direct-access session, so that the direct-access session can be established. On the other hand, when the global IP address and the port number of the controlling device 10 cannot be specified, the controlling device 10 acquires the global IP address and the port number of the controlled device 20 through the always-on connection session provided by the direct-access management server 40 and connects with the controlled device 20 to make direct access. Accordingly, even in an environment where it is not ensured that the global IP address and the port number of the controlling device 10 can be specified, a situation where the direct access between the first device and the second device is possible can be provided with high probability. In other words, communication in a tunneling mode via the server device is stopped until only a situation where the global IP addresses and the port numbers of both the first device and the second device cannot be specified occurs.

In the above respective embodiments, the case where the service URN is content viewing has been described, but the present invention is not limited to this case and is applicable to an application for transferring real-time and large-volume data between the controlling device 10 or the service server 30 and the controlled device 20. Examples of the application of data transmission from the controlled device 20 to the service server 30 include transmitting a content such as a still image or music already stored in a recording device (controlled device 20) to the controlling device 10 such as a mobile phone or a PC (Personal Computer), uploading log data of the controlled device 20 to the service server 30 and using the uploaded log data to analyze the failure of the device, and so on. The present invention is also applicable to data transmission from the controlling device 10 to the controlled device 20. Examples thereof include transmitting a moving image or a photograph taken by the controlling device 10 such as a mobile phone or a downloaded content such as music to the recording device (controlled device 20) and recording it thereon, transmitting it to the recording device (controlled device 20) such as an address book stored in the mobile phone (controlling device 10) and storing it as a backup, and so on.

It is to be understood that the present invention is not intended to be limited to the above embodiments, and various changes may be made therein without departing from the spirit of the present invention.

What is claimed is:

1. A network system, comprising:
   a first device;
   a second device; and a server device capable of registering the first device and the second device in association with each other and establishing an always-on connection session with the second device, the first device including
- a callback request transmission means for transmitting a callback request containing designation information on the first device on a network to the server device,
- a judgment means for judging whether the designation information on the first device on the network is usable, and
- a designation information acquisition means for acquiring designation information on the second device on the network through the server device when the judgment means judges that the designation information on the first device is unusable,
- wherein the callback request transmission means transmits the callback request containing the designation information on the first device to the server device when the judgment means judges that the designation information on the first device is usable, the server device including
- a callback request relay means for transmitting the callback request from the first device to the second device through the always-on connection session, the second device including
- a direct-access session establishment request means for connecting with the first device through the network on the basis of the designation information contained in the callback request received from the server device and transmitting a request for establishment of a session for direct access, and
- a direct-access communication means for communicating with the first device through the session for direct access.

2. The network system as set forth in claim 1,
wherein the first device further includes
a one-time password generation means for generating a one-time password, and
a storage unit for storing the generated onetime password,
wherein the callback request transmission means transmits the callback request to which the one-time password generated by the one-time password generation means is added to the server device,
wherein the direct-access session establishment request means transmits the request for establishment of the session for direct access in which the one-time password contained in the callback request received from the server device is contained, and
wherein the first device further includes a direct-access session establishment response means for comparing the one-time password contained in the request for establishment of the session for direct access received from the second device and the one-time password stored in the storage unit and, when both the one-time passwords match, transmitting a response for the establishment of the session for direct access to the second device.

3. The network system as set forth in claim 1,
wherein the first device further includes
a second direct-access communication means for connecting with the second device through the network on the basis of the designation information on the second device acquired by the designation information acquisition means and performing direct access.

4. The network system as set forth in claim 1,
wherein the first device is one of a controlling device and a service server which provides the controlling device with a service for controlling the second device via the network.

5. A direct-access method for a network system including a first device, a second device, and a server device capable of registering the first device and the second device in association with each other and establishing an always-on connection session with the second device, comprising:
- transmitting, by a callback request transmission means of the first device, a callback request containing designation information on the first device on a network to the server device;
- judging, by a judgment means of the first device, whether the designation information on the first device on the network is usable;
- acquiring, by a designation information acquisition means of the first device, designation information on the second device on the network through the server device when the judgment means judges that the designation information on the first device is unusable;
- transmitting, by the callback request transmission means, the callback request containing the designation information on the first device to the server device when the judgment means judges that the designation information on the first device is usable:
- transmitting, by a callback request relay means of the server device, the callback request from the first device to the second device through the always-on connection session;
- connecting with, by a direct-access session establishment request means of the second device, the first device through the network on the basis of the designation information contained in the callback request received from the server device and transmitting a request for establishment of a session for direct access; and
- communicating with, by a direct-access communication means of the second device, the first device through the session for direct access.

6. A non-transitory computer readable storage medium storing a program for causing a computer that functions as a network household electrical appliance to function as:
- a callback request reception means for receiving, from a server device capable of registering a first device and a second device which is the network household electrical appliance in association with each other and establishing an always-on connection session with the second device, a callback request containing designation information on the first device on a network when the designation information on the first device is usable, and a callback request containing designation information on the second device when the designation information on the first device is unusable;
- a direct-access session establishment request means for connecting with the first device through the network on the basis of the designation information contained in the callback request received by the callback request reception means and transmitting a request for establishment of a session for direct access; and
- a direct-access communication means for communicating with the first device through the session for direct access.

7. A network household electrical appliance, comprising:
a callback request reception section configured to receive, from a server device capable of registering a first device and a second device which is the network household electrical appliance in association with each other and establishing an always-on connection session with the second device, a callback request containing designation information on the first device on a network when the designation information on the first device is usable, and a callback request containing designation information on the second device when the designation information on the first device is unusable;

a direct-access session establishment request section configured to connect with the first device through the network on the basis of the designation information contained in the callback request received by the callback request reception means and transmitting a request for establishment of a session for direct access; and a direct-access communication section configured to communicate with the first device through the session for direct access.

* * * * *